(12) United States Patent
Kosaka et al.

(10) Patent No.: US 6,459,855 B1
(45) Date of Patent: Oct. 1, 2002

(54) ACTUATOR

(75) Inventors: Akira Kosaka, Yao; Junichi Tanii, Izumi; Yoshiharu Tanaka, Kawachinagano; Shoichi Minato, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/567,478

(22) Filed: May 8, 2000

(30) Foreign Application Priority Data

May 18, 1999 (JP) .......................................... 11-136617

(51) Int. Cl.[7] .......................... G03B 15/03; G03B 9/00; G03B 17/00
(52) U.S. Cl. ...................... 396/177; 396/176; 396/439; 396/443
(58) Field of Search ............................... 396/176, 177, 396/178, 358, 443, 535, 538, 439

(56) References Cited

U.S. PATENT DOCUMENTS

| | | | |
|---|---|---|---|
| 4,664,493 A | | 5/1987 | Takagi |
| 4,860,040 A | * | 8/1989 | Tamamura et al. ........... 396/89 |
| 5,185,621 A | | 2/1993 | Kagechika |
| 5,459,544 A | | 10/1995 | Emura |
| 6,048,109 A | * | 4/2000 | Kikuchi ...................... 396/439 |
| 6,094,540 A | * | 7/2000 | Kikuchi ...................... 136/245 |
| 6,096,969 A | * | 8/2000 | Fujita et al. ................. 136/245 |
| 6,307,678 B2 | * | 10/2001 | Kosaka et al. .............. 359/554 |

FOREIGN PATENT DOCUMENTS

| | | | |
|---|---|---|---|
| JP | 63-287934 | * | 11/1988 |
| JP | 2-221944 | * | 9/1990 |
| JP | 4-2859944 | * | 10/1992 |

* cited by examiner

*Primary Examiner*—Alan A. Mathews
(74) *Attorney, Agent, or Firm*—McDermott, Will & Emery

(57) ABSTRACT

An actuator applied with shape memory alloy which can be operated in a wide operating temperature range and has a long life time. At a normal ambient temperature, when the first wire of the acting member made of shape memory alloy in which predetermined shape is memorized in advance, is heated, it is transformed to the memorized shape to enable the acting member to be moved. A relative low stress is generated at the first wire and its life-time is not shortened. In the case that the ambient temperature is increased to exceed a transformation starting temperature of the shape memory alloy, the second wire of shape memory alloy is transformed to the memorized shape to generate a high stress at the first wire and to increase the transformation starting temperature of the first wire. With such an arrangement as above, it is possible to operate the actuator applied with the shape memory alloy in a wide operating temperature range.

17 Claims, 22 Drawing Sheets

US 6,459,855 B1

ACTUATOR

This application is based on application No. 11-136617 filed in Japan, the contents of which is hereby incorporated by reference.

BACKGROUND OF THE INVENTION

1. Field of the Invention

This invention relates to an actuator.

2. Prior Art

Shape memory alloy has a characteristic that if its predetermined shape is set at a predetermined high temperature region, for example, 60° C. and its shape is memorized in advance, it is transformed into the memorized shape when the shape memory alloy is heated to cause its temperature to exceed a transformation temperature, for example, 60° C., even if the shape is transformed into a shape different from the memorized shape at a normal temperature region which is lower than the predetermined high temperature, for example, 20° C.

There is provided an actuator in which an acting member is of shape memory alloy under utilization of this characteristic. This actuator is constructed such that the acting member is formed by a wire of shape memory alloy, for example, and a predetermined first shape, for example, a shrunk shape is memorized in the acting member at a predetermined high temperature region. Then, at the normal temperature region which is lower than this temperature range, an external force is applied to the acting member with a spring and the like to transform it into a second shape different from the first shape, for example, an extended shape, a driven member is connected to the acting member and the driven member is set at a second position.

Under this condition, when the acting member of shape memory alloy is heated more than a transformation temperature, the acting member is transformed from the aforesaid second shape, i.e. the extended shape to a memorized first shape, i.e. the shrunk shape and transformed, and the driven member connected to the acting member can be moved from the second position to the first position.

Then, when the aforesaid acting member of shape memory alloy is cooled to its normal temperature, the acting member is transformed again into a second shape, i.e. a stretched shape with an external force, a force of spring and the like, the driven member connected to the acting member can be moved from the first position to the second position, i.e. its initial position.

FIGS. 21 and 22 show one example of an actuator provided with the acting member of shape memory alloy, wherein this is an example in which the actuator is applied to a mechanism for engaging with or releasing a charge lever for a camera and the like. FIG. 21 indicates an initial state in which the actuator is not operated and the charge lever is held and FIG. 22 indicates a state in which the actuator is operated and the charge lever is released.

In FIGS. 21 and 22, reference numeral 101 denotes an engaging lever, reference numeral 102 denotes an acting member of shape memory alloy and this acting member is a wire of shape memory alloy. Reference numeral 104 denotes a spring for retracting the engaging lever 101, reference numeral 106 denotes a charge lever and reference numeral 107 denotes a running spring for retracting the charge lever 106.

The wire 102 of shape memory alloy is made such that its one end is fixed to a pin 101a of an engaging lever 101 and the other end is fixed to a fixed pin 102a arranged on a fixing member such as a frame not shown. To both ends of the wire of shape memory alloy are connected a switch SW and a power supply BA in series. When the switch SW is closed, an electrical current is flowed from the power supply BA to the wire 102 of shape memory alloy and heat is generated by a resistance of the wire itself. It is assumed that a predetermined shrunk shape is memorized in advance in the wire 102 of shape memory alloy.

The engaging lever 101 is rotatably supported around a shaft 103 and biased to rotate in a clockwise direction by a spring 104 suspended between the fixed pin 104a on the fixed member and a pin 104b, and it is abutted against a stopper pin 105 and stopped there.

To the charge lever 106 is fixed one end 107a of the running lever 107, and the other end 107b of the running spring 107 is fixed to the fixed member 109. The charge lever 106 is moved in a leftward direction as viewed in FIG. a 21 by a charge mechanism not shown under its initial state, engaged with an engaging claw 101c at the extremity end of the engaging lever 101 and it is held at the position shown in FIG. 21. In this state, the running spring 107 is biased.

When the switch SW is turned on, an electrical current is flowed from the power supply BA to generate heat and when its temperature is increased by more than a transformation temperature, the wire 102 of shape memory alloy is transformed into a predetermined shrunk shape memorized in it against a biasing force of the spring 104.

With such an arrangement as above, since the engaging lever 101 is turned in a counterclockwise direction around the shaft 103 and the engaging claw 101c of the engaging lever 101 is disengaged from the charge lever 106 as shown in FIG. 22, the charge lever 106 is moved in a rightward direction in FIG. 21 by a biasing force of the running spring 107 to perform some predetermined operations such as a spring-up of a mirror in a single-lens reflex camera, an exposure starting operation, opening or closing of a film cartridge lid, and a pop-up of a flash light emitting device, for example, and then it is abutted against the stopper pin 108 and stopped there.

When the switch SW is turned off to shut off a supplying of electrical current to the wire 102 of shape memory alloy, the wire 102 of shape memory alloy is cooled. The engaging lever 101 is turned in clockwise direction around the shaft 103 by a biasing force of the spring 104 and the engaging claw 101c at its extremity end is returned back to a position where it can be engaged.

In turn, the charge lever 106 is moved again in a leftward direction as viewed in FIG. 22 by a charge mechanism not shown, engaged with the engaging claw 101c at the extremity end of the engaging lever 101, returned back to its initial state shown in FIG. 21 and at the same time the running spring 107 is biased.

The actuator applied with shape memory alloy described above has some features such as a simple structure, light weight and easy control and then it can be applied to various kinds of devices.

However, it has been found that the actuator applied with the shape memory alloy has two problems to be solved which will be described as follows.

The first problem consists in the fact that if an ambient temperature becomes more than a transformation temperature of shape memory alloy even in the case that it is not necessary to operate the actuator, the acting member is transformed to its memorized shape and performs a non-intended operation. Then, as long as the actuator is set at ambient temperature more than the transformation temperature of shape memory alloy, there occurs a disadvantage that the transformed state of the acting member to the memorized shape is continued to be kept.

The second problem is a fact that a close relation is kept among a stress caused by a spring and the like applied to the shape memory alloy, and a transformation starting temperature and its life, and a high stress enables a transformation starting temperature to be increased, but a life of the acting member becomes short under a high stress.

That is, if a high tension is applied to the acting member in such a way that the actuator may not be erroneously operated within a wide operating temperature range and a high stress is generated, a life of the acting member becomes short, and in turn if the tension applied to the acting member is reduced to attain a sufficient life time, and the stress is set to be low, there occurs a disadvantage that the operable temperature range not performing any malfunction is made narrow and an operating temperature range required for the actuator can not be assured.

It is an object of the present invention to provide an actuator applied with a new shape memory alloy solving the problems without damaging superior characteristics found in the shape memory alloy.

SUMMARY OF THE INVENTION

It is a major object of the present invention to provide an actuator applied with a new shape memory alloy which can be operated within a wide operating temperature range and has a long life time.

It is another object of the present invention to provide an actuator applied with a new shape memory alloy in which a malfunction generated when an ambient temperature becomes more than a transformation temperature of shape memory alloy is prevented and its operating temperature range is assured to be wide.

It is a still further object of the present invention to provide an actuator applied with a new shape memory alloy in which a value of stress applied to the acting member is adjusted in response to an ambient temperature, a value of stress is set to be low at a low temperature range and a value of stress is set to be high at a high temperature range to cause the operating temperature range to be wide.

It is a yet further object of the present invention to provide an actuator applied with a new shape memory alloy in which an operation caused by the acting member is made null and an occurrence of malfunction not intended can be prevented in advance even if the acting member of shape memory alloy is transformed to its memorized shape when the ambient temperature becomes more than a transformation temperature of shape memory alloy.

Other objects of the present invention will become apparent from the detailed description of the present invention in reference to the drawings.

DETAILED DESCRIPTION OF THE PREFERRED EMBODIMENTS

Some preferred embodiments of the present invention will be described as follows.

First Preferred Embodiment

The first preferred embodiment provides a solving means of the first object of the present invention described above in which the actuator is not erroneously operated even with an operation not intended by the acting member of shape memory alloy generated when the ambient temperature exceeds a transformation temperature of shape memory alloy (hereinafter called as a malfunction).

Figure 1:
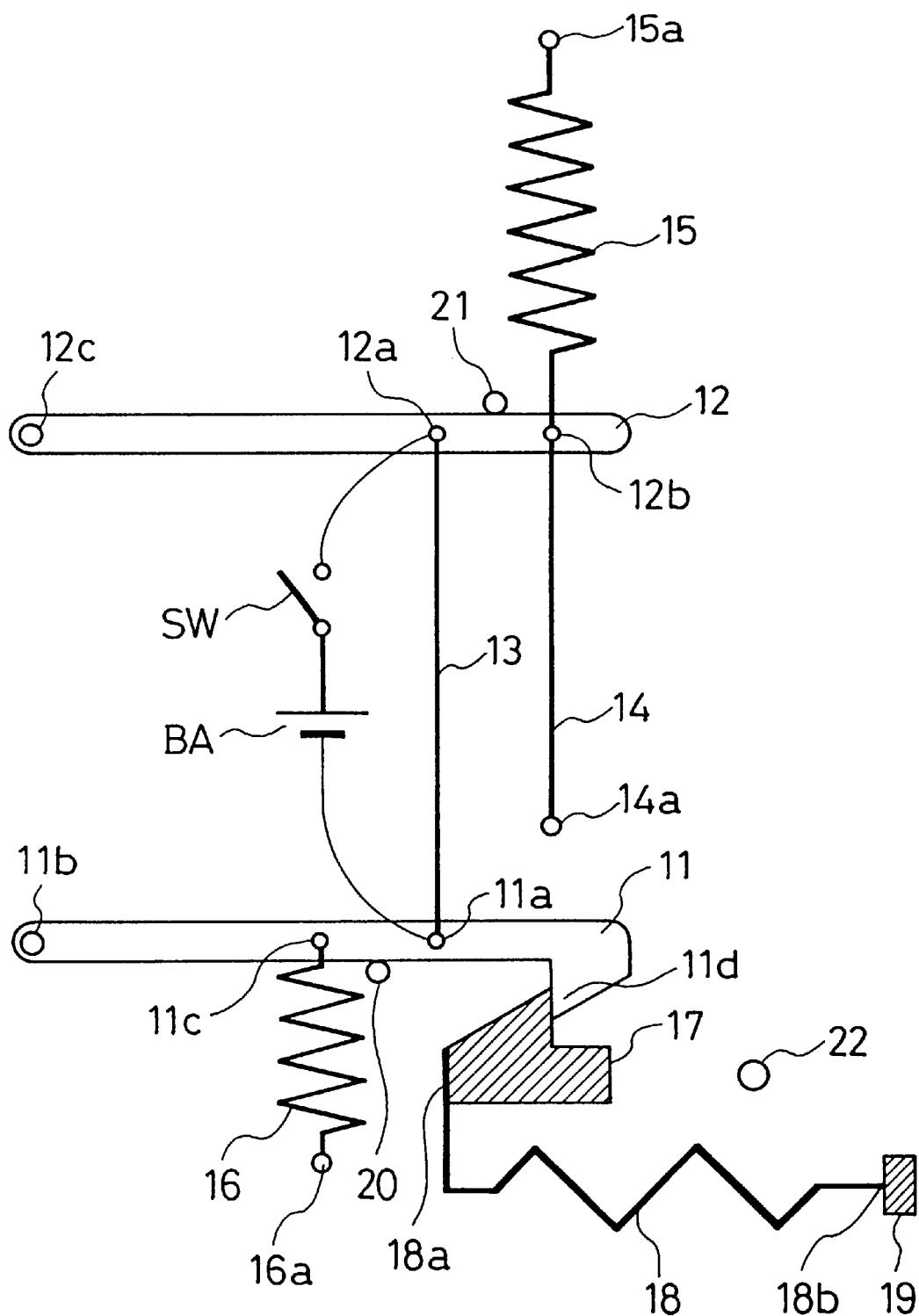
FIG. 1 is a view for illustrating a first preferred embodiment of the actuator applied with a shape memory alloy.
Figure 2:
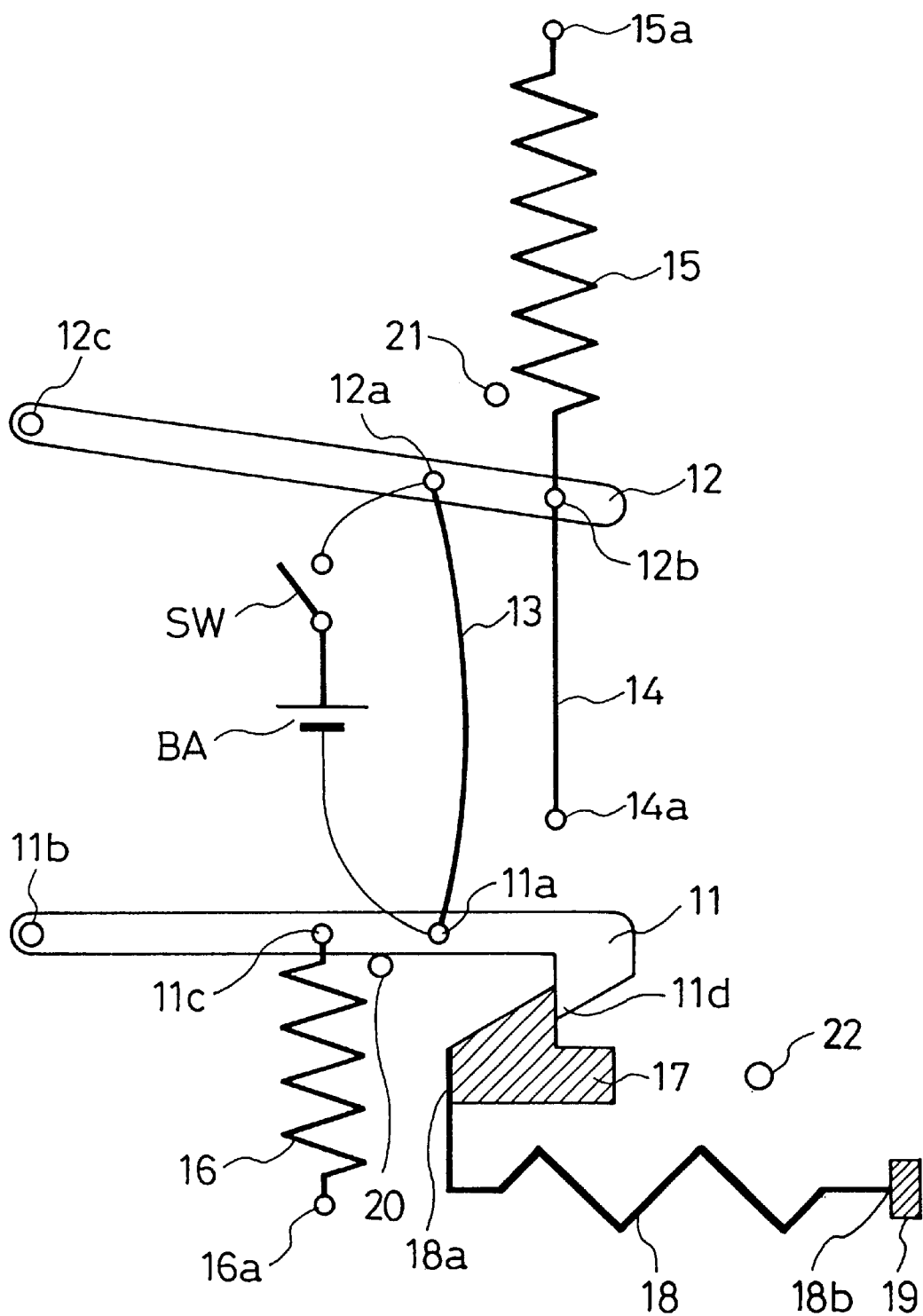
FIG. 2 is a view for illustrating a state of the actuator shown in FIG. 1 when a temperature compensating mechanism is operated in which an ambient temperature exceeds a transformation temperature of shape memory alloy.

FIGS. 1 and 2 illustrate the actuator in which the acting member applied with the shape memory alloy for engaging/releasing the charge lever is provided, wherein there is provided a temperature compensating mechanism for preventing a malfunction of the acting member generated when the ambient temperature exceeds a transformation temperature of shape memory alloy.

Referring now to FIGS. 1 and 2, its constitution and operation will be described as follows. Reference numeral 11 denotes an engaging lever, reference numeral 12 denotes a temperature compensating lever, reference numeral 17 denotes a charge lever, reference numeral 15 denotes a spring for pulling the temperature compensating lever 12, reference numeral 16 denotes a spring for pulling the engaging lever 11, reference numeral 18 denotes a running spring for pulling the charge lever 17, and reference numeral 19 denotes a fixing member for fixing one end of the running spring 18 which is arranged on a frame not shown.

The engaging lever 11 is rotatably supported around a shaft 11b and then a wire 13 of shape memory alloy acting as a first acting member is suspended between the pin 11a on the engaging lever 11 and the pin 12a on the temperature compensating lever 12.

To both ends of the wire 13 of shape memory alloy acting as the first acting member are connected a switch SW and a power supply BA in series to each other. When the switch SW is closed, an electrical current is flowed from the power supply BA to the wire 13 of shape memory alloy and heat is generated through resistance of the wire itself. It is assumed that a predetermined shrunk shape is memorized in the wire 13 of shape memory alloy.

In addition, between the pin 11c on the engaging lever 11 and the fixed pin 16a on the frame not shown is suspended a spring 16, the engaging lever 11 is biased by the spring 16 so as to rotate in a clockwise direction around the shaft 11b, it is abutted against the stopper pin 20 and stopped there.

One end 18a of the running spring 18 is fixed to the charge lever 17, and the other end 18b of the running spring 18 is fixed to the fixed member 19 on the frame not shown. The charge lever 17 is moved in a leftward direction by a charge mechanism not shown in its initial state as viewed in FIG. 1 and in this state the running spring 18 is biased.

The temperature compensating lever 12 is rotatably supported around the shaft 12c. Between the pin 12b on the temperature compensating lever 12 and the fixed pin 14a on the frame not shown is suspended a wire 14 of shape memory alloy acting as a third acting member. Between the pin 12b and the fixed pin 15a on the frame not shown is suspended a spring 15, the temperature compensating lever 12 is biased with the spring 15 to be rotated around the shaft 12c in a counterclockwise, abutted against the stopping pin 21 and stopped there.

A temperature compensating mechanism is constituted by the temperature compensating lever 12, the wire 14 of shape memory alloy acting as the third acting member and the spring 15. In addition, the wire 14 of shape memory alloy acting as the third acting member constituting the temperature compensating mechanism is made of material having the same transformation temperature characteristic as that of the wire 13 of shape memory alloy acting as the first acting member, or having a transformation temperature characteristic transformed at a lower temperature than the former.

Then, its operation will be described as follows. At first, the temperature compensating lever 12 is not operated at the normal ambient temperature less than the transformation temperature of the wire 14 of shape memory alloy constituting the temperature compensating mechanism and this lever may perform the quite similar operation as that of the conventional actuator described as a prior art.

That is, when the switch SW is turned on, an electrical current is flowed from the power supply BA to the wire 13 of shape memory alloy and then the wire 13 of shape memory alloy generates heat. As the temperature is increased more than the transformation temperature, the wire 13 made of memory alloy is transformed to a memorized predetermined shrunk shape against the biasing force of the spring 16.

With such an arrangement as above, the engaging lever 11 is rotated around the shaft 11b in a counterclockwise direction, and the engaging claw 11d of the engaging lever 11 is disengaged from the charge lever 17, so that the charge lever 17 may be moved in a rightward direction as viewed in FIG. 1 by the biasing force of the running spring 18 to execute some predetermined operations such as a spring-up of a mirror, starting of exposure, opening or closing of a film cartridge lid, and a pop-up of a flash unit of a single-lens reflex camera, for example, and then the lever is abutted against the stopper pin 22 and stopped there. When the switch SW is turned off and the supplying of the electrical current to the wire 13 of shape memory alloy is shut off, the wire 13 of shape memory alloy is cooled. The engaging lever 11 is turned around the shaft 11b by the biasing force of the spring 16 in a clockwise direction and the engaging claw 11d at the extremity end is returned back to its position where it can be engaged.

When the charge lever 17 is moved again in a leftward direction as viewed in FIG. 1 by a charge mechanism not shown, the charge lever 17 is engaged with the engaging claw 11d at the extremity end of the engaging lever 11 and returns back to its initial state and further the running spring 18 is biased.

Next, a situation in which the ambient temperature exceeds a transformation temperature of the wire 14 of shape memory alloy acting as the third acting member constituting the temperature compensating mechanism will be described as follows. FIG. 2 shows a situation in which the ambient temperature exceeds the transformation temperature of the wire 14 of shape memory alloy, wherein the wire 14 of shape memory alloy is transformed to a memorized predetermined shrunk shape against a biasing force of the spring 15 and then the temperature compensating lever 12 is rotated in a clockwise direction around the shaft 12c.

Since the ambient temperature at this time is lower than the transformation temperature of the wire 13 of shape memory alloy acting as the first acting member, the wire 13 of shape memory alloy is not transformed into a predetermined shrunk shape. Due to this fact, the wire 13 of shape memory alloy is loosened as shown in FIG. 2 and does not pull up the engaging lever 11 in an upward direction as viewed in FIG. 2, so that the engaged state of the charge lever 17 with the engaging lever 11 is maintained and no malfunction is performed.

Further, in the case that the ambient temperature exceeds the transformation temperature of the wire 13 of shape memory alloy, the wire 13 of shape memory alloy is also transformed into the memorized predetermined shrunk shape, although as described above, the temperature compensating lever 12 is turned around the shaft 12c in a clockwise direction and looseness is produced at the wire 13 of shape memory alloy, so that even if the wire 13 is transformed to the shrunk shape, it does not become an amount of transformation in which the engaged state of the charge lever 17 is released, the engaged state of the charged lever 17 is maintained and no malfunction occurs.

A relation between a stress generated at the acting member of shape memory alloy and its transformation temperature will be described as follows. In the case of nickel-titanium alloy which is a typical shape memory alloy, as a stress generated at the acting member of shape memory alloy is increased, its transformation temperature is shifted toward a high temperature.

Figure 3:
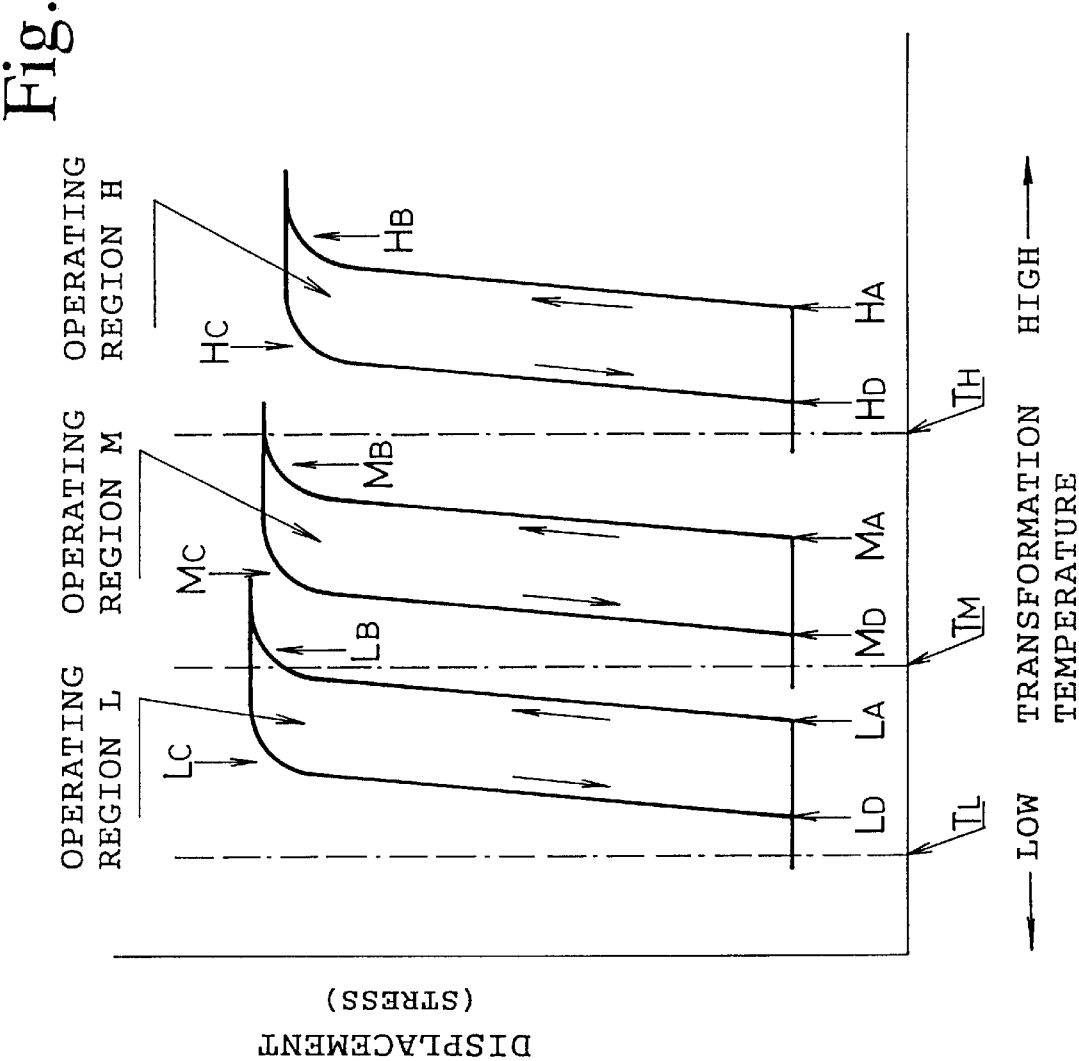
FIG. 3 is a view for showing a relation between a transformation temperature of the acting member of shape memory alloy and a generated displacement.

FIG. 3 is a view for showing a relation between a displacement applied to the acting member of shape memory alloy (which is also a value of stress) and a transformation temperature.

That is, when the acting member of shape memory alloy is operated in an operating region H more than a temperature TH, a value of load is determined in such a way that a high stress H is generated at the acting member of shape memory alloy; when the acting member of shape memory alloy is operated in an operating region M which is less than the temperature TH and more than a temperature TM, a value of load is determined in such a way that a middle stress M is generated at the acting member of shape memory alloy; and when the acting member of shape memory alloy is operated in an operating region L which is less than the temperature TM, a value of load is determined in such a way that a low stress L is generated at the acting member of shape memory alloy.

Referring now to FIGS. 1, 2 and 3, a variation of the ambient temperature and the transformation state of the acting member of shape memory alloy will be described in reference to the case in which a value of load applied by the spring 15 to the wire 14 of shape memory alloy is determined in such a way that a temperature where the actuator should be operated safely is less than the temperature region TM and an operating region of the wire 14 of shape memory alloy constituting the temperature compensating mechanism is set to the operating region M.

When the ambient temperature is increased to exceed the transformation temperature MA, the wire 14 of shape memory alloy of the third acting member constituting a temperature compensating mechanism starts to shrink and transform against a biasing force of the spring 15, an amount of displacement becomes maximum at the transformation temperature MB, and subsequently its displacement is not increased even if the ambient temperature is increased.

Further, when an ambient temperature is increased to exceed the transformation temperature MA, the wire 13 of shape memory alloy of the third acting member also starts to shrink and transform against a biasing force of the spring 16, an amount of displacement becomes maximum at the transformation temperature HB, although subsequently its displacement is not increased even if the ambient temperature is increased.

Even if the wire 13 of shape memory alloy starts to shrink and transform, an amount of motion of the temperature compensating lever 12 turned in a clockwise direction based on a shrunk transformation of the wire 14 of shape memory alloy constituting the temperature compensating mechanism is set to be higher than a shrink transformation amount of the wire 13 of shape memory alloy, resulting in that it is possible to prevent the engaging lever 11 from being operated even with the shrinkage transformation of the wire 13 of shape memory alloy and further even if the ambient temperature is increased to exceed the transformation temperature HA, it is possible to prevent a malfunction of the actuator.

When the ambient temperature is decreased from the transformation temperature HA, the wire 13 of shape memory alloy is at first transformed in an opposite direction from the transformation temperature HC and the wire 13 starts to extend and transform toward its initial shape. In addition, when the ambient temperature is decreased over the transformation temperature MC, the wire 14 of shape memory alloy is also started to extend and transform toward the shape at its initial state by a biasing force of the spring 15. The temperature compensating lever 12 is turned around the shaft 12c in a counterclockwise direction to eliminate looseness of the wire 13 and then it is recovered safely to the initial state shown in FIG. 1.

In FIG. 3, the temperature region is divided into three segments in response to a stress, although there occurs sometimes that the temperature regions are partially overlapped in response to a stress and even in that case, the temperature compensating mechanism is normally operated.

Additionally, it is also possible to constitute such that the temperature compensating lever 12 is moved by the bimetal in place of the wire 14 of shape memory alloy.

Figure 4:
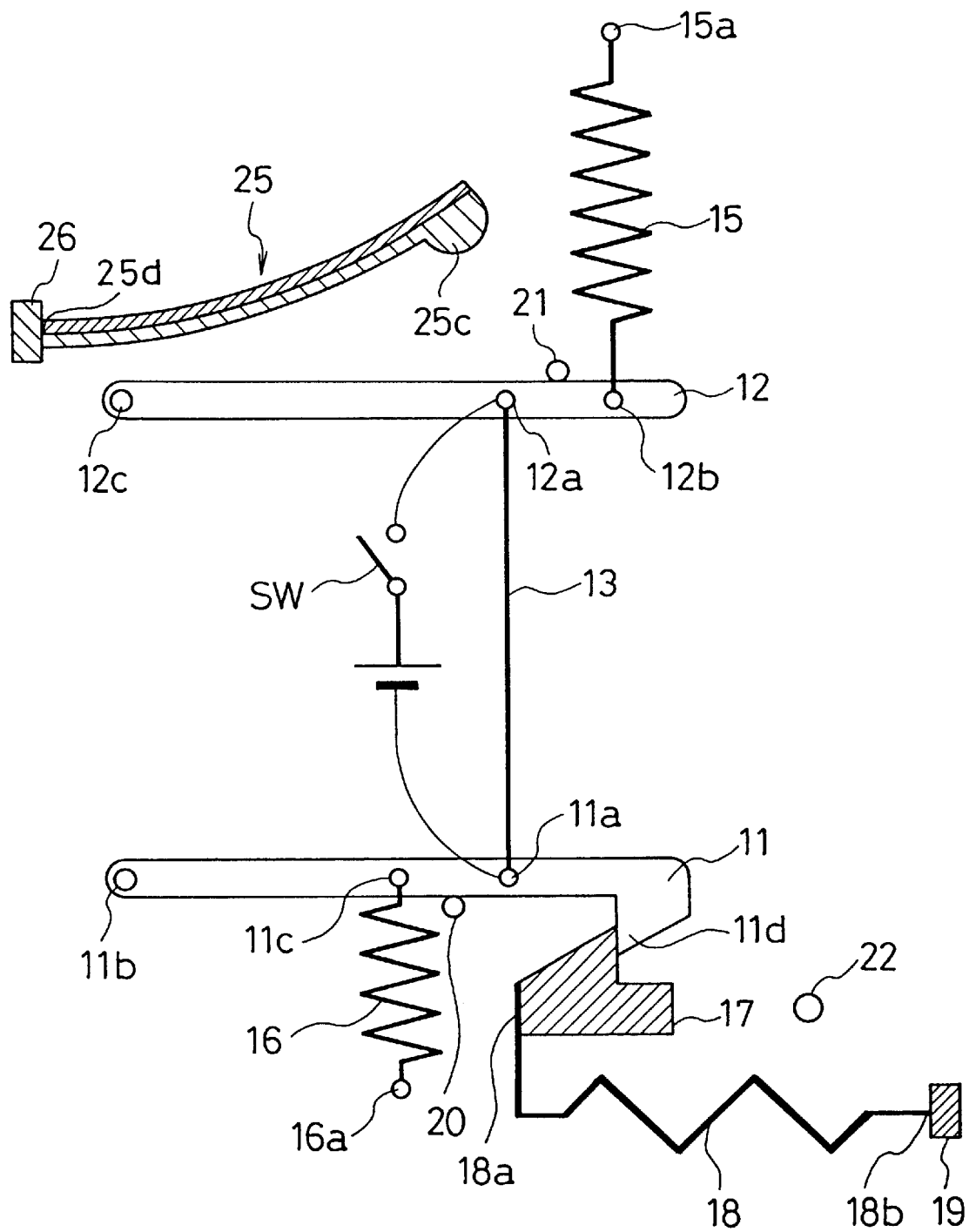
FIG. 4 is a view for illustrating an example of modification in which a temperature compensating mechanism of the actuator of the first preferred embodiment shown in FIG. 1 is made of bimetal.
Figure 5:
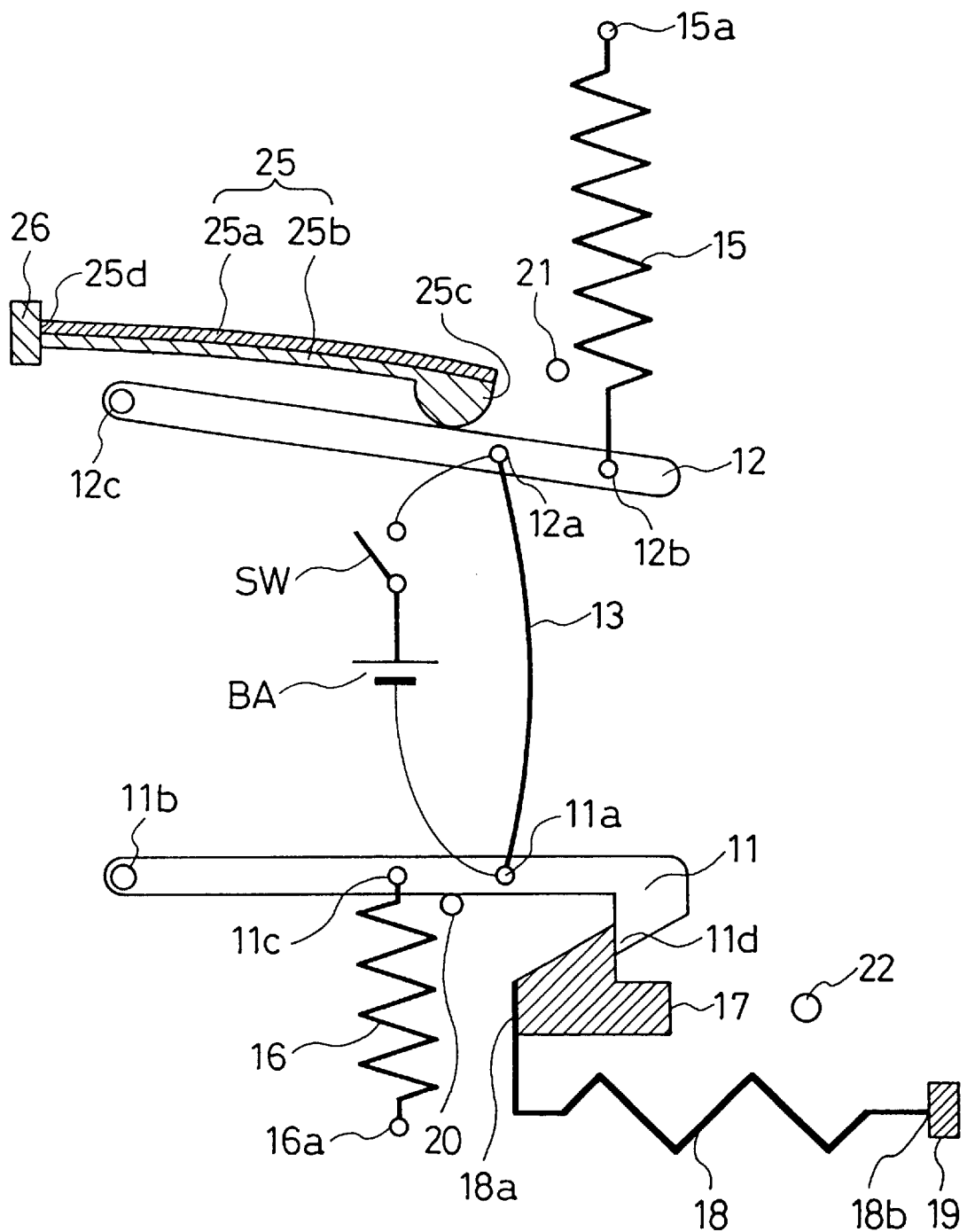
FIG. 5 is a view for illustrating a state of the actuator when a temperature compensating mechanism made of bimetal shown in FIG. 4 is operated.

FIGS. 4 and 5 are views for showing an example of modification in which the temperature compensating mechanism of the actuator of the first preferred embodiment is constituted by a bimetal. A difference between this preferred embodiment and the constitution shown in FIGS. 1 and 2 described above consists in the fact that the wire 14 of shape memory alloy is replaced with a bimetal and other constitutions as well as other operations are not different from those of the first preferred embodiment, so that the same component parts are denoted by the same reference numerals and their description will be omitted and only the temperature compensating mechanism will be described.

The temperature compensating lever 12 is rotatably supported around the shaft 12c. A spring 15 is suspended between the pin 12b on the temperature compensating lever 12 and the fixed pin 15a on the frame not shown and then the temperature compensating lever 12 is biased to turn around the shaft 12c by the spring 15 in a counterclockwise direction.

In addition, a bimetal 25 is installed on the temperature compensating lever 12 and its free end 25c is arranged at a location where it can be abutted against the temperature compensating lever 12. The other end 25d of the bimetal 25 is fixed to the fixed member 26 on the frame not shown. Further, the bimetal 25 is a well-known bimetal constituted in such a way that two kinds of metals 25a and 25b having a different coefficient of thermal expansion are integrally adhered to each other.

In the case that the ambient temperature is a normal temperature, the free end 25c of the bimetal 25 is placed at a position spaced apart from the temperature compensating lever 12, and the temperature compensating lever 12 is biased by the spring 15 to turn around the shaft 12c in a counterclockwise direction, it is abutted against the stopper pin 21 and stopped there. FIG. 4 shows this state.

When the ambient temperature is increased up to a value near the predetermined temperature less than the transformation temperature of the wire 13 of shape memory alloy, the bimetal 25 is bent, its free end 25c is abutted against the temperature compensating lever 12 to cause the temperature compensating lever 12 to be turned around the shaft 12c in a clockwise direction against a biasing force of the spring 15, resulting in that the bimetal becomes a state shown in FIG. 5.

Since the ambient temperature in this case is lower than the transformation temperature of the wire 13 of shape memory alloy, the wire 13 of shape memory alloy is not transformed to the predetermined shrunk shape memorized in it. Due to this fact, the wire 13 of shape memory alloy is loosened as shown in FIG. 5 and the engaging lever 11 is not pulled up in an upward direction, so that the engaged state of the charge lever 17 kept by the engaging lever 11 is maintained and so no malfunction is carried out.

Further, in the case that the ambient temperature is increased and the wire 13 of shape memory alloy exceeds the transformation temperature, the wire 13 of shape memory alloy is also transformed to the memorized predetermined shrunk shape.

However, as described above, the bimetal 25 is bent to cause the temperature compensating lever 12 to be turned around the shaft 12c in a clockwise direction against a biasing force of the spring 15 and a looseness is produced in the wire 13 of shape memory alloy, so that even if it is transformed into the shrunk shape, it does not become such an amount of transformation as one in which the engaged state of the charging lever 17 is released, the engaged state of the charge lever 17 is maintained and no malfunction is performed.

Second Preferred Embodiment

The second preferred embodiment is similar to the first preferred embodiment, wherein the second preferred embodiment provides a solving means of the first problem of the present invention in which no malfunction of the actuator is performed even if non-intended operation (malfunction) of an acting member of shape memory alloy generated when the ambient temperature exceeds the transformation temperature of shape memory alloy is carried out.

Figure 6:
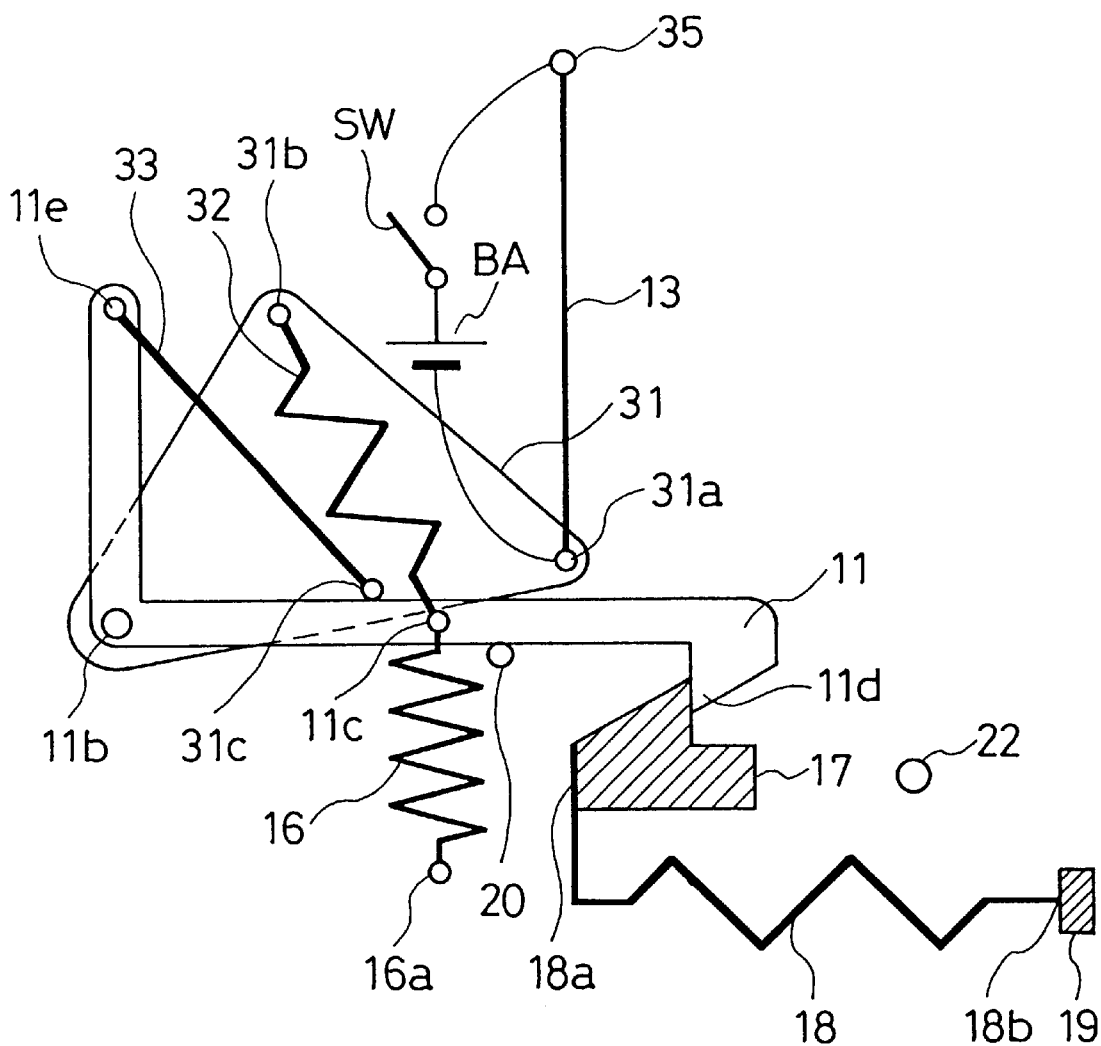
FIG. 6 is a view for illustrating a second preferred embodiment of the actuator applied with a shape memory alloy.
Figure 7:
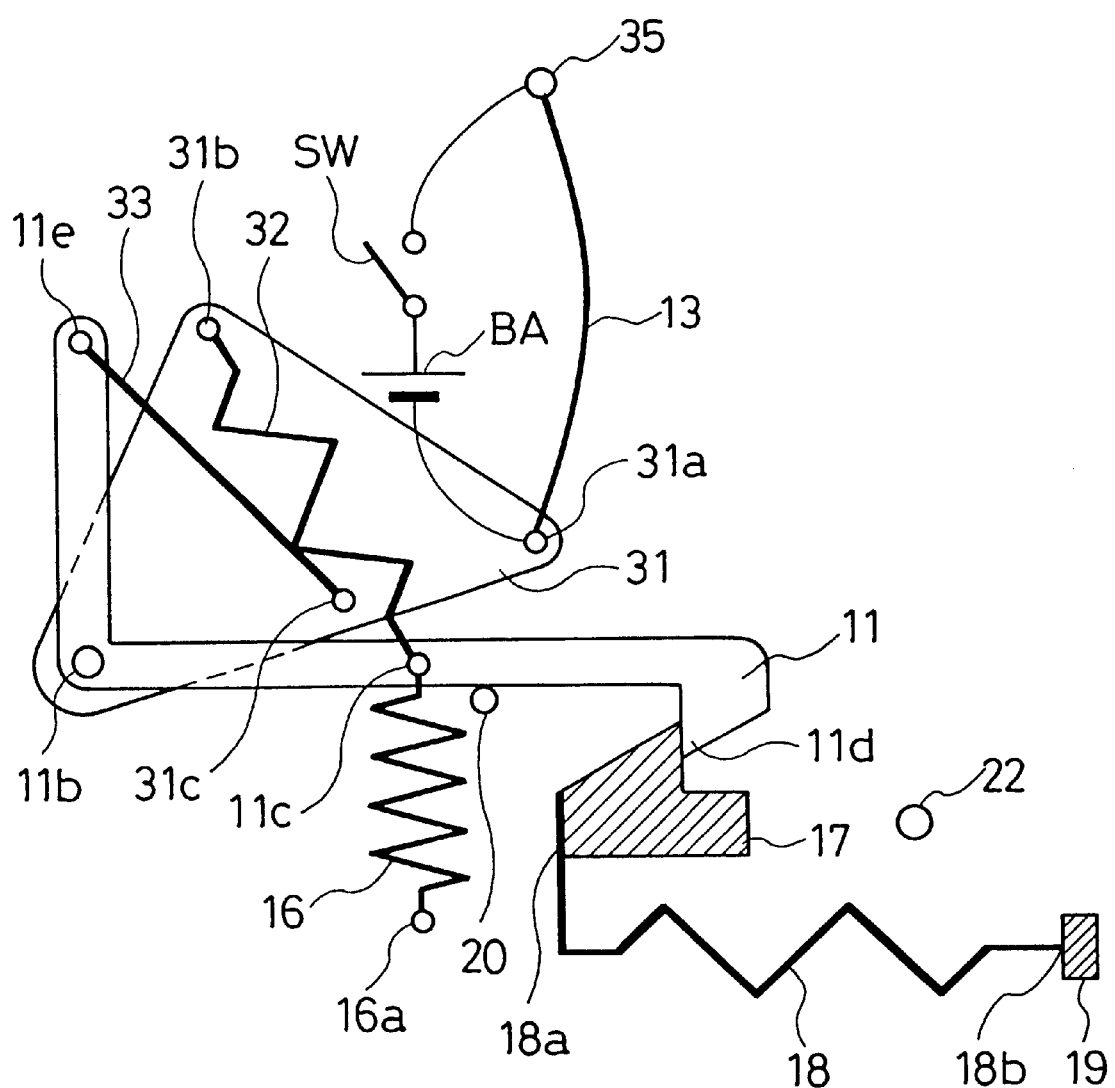
FIG. 7 is a view for illustrating a state of the actuator shown in FIG. 6 when an ambient temperature exceeds a transformation temperature of shape memory alloy.

FIGS. 6 and 7 show an actuator applied with an acting member of shape memory alloy for engaging/releasing the charge lever and provided with a temperature compensating mechanism for preventing a malfunction of the acting member generated when the ambient temperature exceeds the transformation temperature of shape memory alloy. The same component parts as those of the first preferred embodiment on the temperature compensating lever 31 is formed a protrusion abutted against the engaging lever 11. It is assumed that a predetermined shrunk shape is memorized in advance in the wires 13 and 33 of shape memory alloy.

Between a pin 31b on the temperature compensating lever 31 and a pin 11c on the engaging lever 11 is suspended a spring 32 having a larger spring constant (hard) than that of the spring 16. Although the spring 32 biases the temperature compensating lever 31 to turn in a clockwise direction around the shaft 11b against the engaging lever 11, when the protrusion of the pin 31c on the temperature compensating lever 31 is abutted against the engaging lever 11, its turning operation more than that of it is prohibited and then the temperature compensating lever 31 and the engaging lever 11 are integrally rotatable in a clockwise direction around the shaft 11b.

Between the pin 11c on the engaging lever 11 and the fixed pin 16a is suspended a spring 16, and the engaging lever 11 is biased by a spring 16 around the shaft 11b in a clockwise direction, and the engaging lever 11 is abutted against the stopper pin 20 and stopped there.

As described above, since the temperature compensating lever 31 and the engaging lever 11 are constructed such that they can be integrally turned around the shaft denoted by the same reference numerals to facilitate its reference and their detailed description will be omitted.

Referring now to FIGS. 6 and 7, its constitution and operation will be described. 11 denotes a substantial L-shaped engaging lever, 17 denotes a charge lever, 16 denotes a spring for pulling the engaging lever 11, 18 denotes a running spring for pulling the charge lever 17, and 19 denotes a fixing member for fixing one end of the running spring 18. In addition, 31 denotes a temperature compensating lever, and 32 denotes a spring suspended between the temperature compensating lever 31 and the engaging lever 11.

Each of the engaging lever 11 and the temperature compensating lever 31 is independently supported around the common shaft 11b in a rotatable manner, and the wire 13 of shape memory alloy of the first acting member is suspended between the pin 31a on the temperature compensating lever 31 and the fixed pin 35 on the frame not shown.

In addition, between a pin 11e at the extremity end of the L-shaped extending section of the engaging lever 11 and a pin 31c on the temperature compensating lever 31 is suspended a wire 33 of shape memory alloy of a third acting member for use in compensating temperature. On the pin 31c the shaft 11b by a spring 32 having a larger spring constant than that of the spring 16, the wire 13 of shape memory alloy of the first acting member is applied with a tension force under biasing force of the spring 16.

To the charge lever 17 is fixed one end 18a of the running spring 18, and then the other end 18b of the running spring 18 is fixed to the fixed member 19. The charge lever 17 is moved in a leftward direction as viewed in FIG. 6 under its initial state by a charge mechanism not shown, and it is engaged with the engaging claw 11d at the extremity end of the engaging lever 11 and held at a position shown in FIG. 6 and the running spring 18 is biased in this state.

The temperature compensating mechanism is comprised of a temperature compensating lever 31, a wire 33 of shape memory alloy of the third acting member and the spring 32. In addition, the wire 33 of shape memory alloy constituting the temperature compensating mechanism is constituted by material having the same transformation temperature characteristic as that of the wire 13 of shape memory alloy of the first acting member, or the transformation temperature characteristic where the material is transformed at a lower temperature than the transformation temperature of the wire 13

Then, referring now to FIGS. 6 and 7, its operation will be described. At first, the temperature compensating lever 31 is not operated at a normal ambient temperature less than the transformation temperature of the wire 33 of shape memory alloy of the third acting member constituting the temperature compensating mechanism, but operated in the quite same manner as that of the conventional actuator described as a prior art.

That is, when the switch SW is turned on, an electrical current is supplied from the power supply BA to the wire 13 of shape memory alloy of the first acting member, the wire 13 of shape memory alloy generates heat, and when its temperature is increased more than the transformation temperature, the wire 13 of shape memory alloy is transformed to a memorized predetermined shrunk shape against the biasing force of the spring 16, thereby the engaging lever 11 and the temperature compensating lever 31 are integrally turned around the shaft 11b in a counterclockwise direction.

With such an arrangement as above, since the engaging claw 11d of the engaging lever 11 is released from the charge lever 17, the charge lever 17 is moved in a rightward direction as viewed in FIG. 6 by a biasing force of the running spring 18 to perform the predetermined operations, such as, a pop-up of a mirror, an exposure starting operation, against a biasing force of the spring 32, the temperature compensating lever 31 is turned around the shaft 11b in a counterclockwise direction, but the engaging lever 11 is not turned.

The ambient temperature at this time is lower than the transformation temperature of the wire 13 of shape memory alloy of the first acting member, so that the wire 13 of shape memory alloy is not transformed to the memorized predetermined shrunk shape. Due to this fact, the wire 13 of shape memory alloy is loosened as shown in FIG. 7 and the engaging lever 11 is not pulled up in an upward direction as viewed in FIG. 7, resulting in that the engaged state of the charge lever 17 caused by the engaging lever 11 is maintained and no malfunction is performed.

Further, in the case that the ambient temperature is increased and the wire 13 of shape memory alloy also exceeds the transformation temperature, although the wire 13 of shape memory alloy is also transformed to a memorized shrunk shape, at this time, the temperature compensating lever 31 is being turned around the shaft 11b in a counterclockwise direction against the biasing force of a spring 32 and a looseness is generated at the wire 13 of shape memory alloy, so that even if the wire 13 of shape memory alloy is transformed into the shrunk shape, it does not become an opening or closing of a film cartridge 11d and a pop-up of flash light emitting device and the like in case of a single reflex lens camera, and then it is abutted against the stopper pin 22 and stopped.

When the switch SW is turned off to shut off the supplying of the electrical current to the wire 13 of shape memory alloy, the wire 13 of shape memory alloy is cooled. The engaging lever 11 and the temperature compensating lever 31 are turned in a clockwise direction by a biasing force of the spring 16 and the engaging claw 11d at the extremity end is returned to an engageable position. The charge lever 17 is moved again in a leftward direction as viewed in FIG. 6 by a charge mechanism not shown, engaged with the engaging claw 11d at the extremity end of the engaging lever 11 and returned back to its initial state and at the same time the running spring 18 is biased.

Next, there will be described a case in which the ambient temperature exceeds the transformation temperature of the wire 33 of shape memory alloy constituting the temperature compensating mechanism. FIG. 7 shows a case in which the ambient temperature exceeds the transformation temperature of the wire 33 of shape memory alloy of the third acting member, wherein the wire 33 of shape memory alloy is transformed to a memorized predetermined shrunk shape amount of transformation until the engaged state of the charge lever 17 is released, the engaged state of the charge lever 17 is maintained and no malfunction is performed.

Third Preferred Embodiment

A third preferred embodiment provides a solving means for solving the first problem of the present invention in the same manner as that of the first preferred embodiment in which the actuator does not show any malfunction even with an unintended operation (malfunction) of the acting member of shape memory alloy generated when the ambient temperature exceeds the transformation temperature of shape memory alloy.

Figure 8:
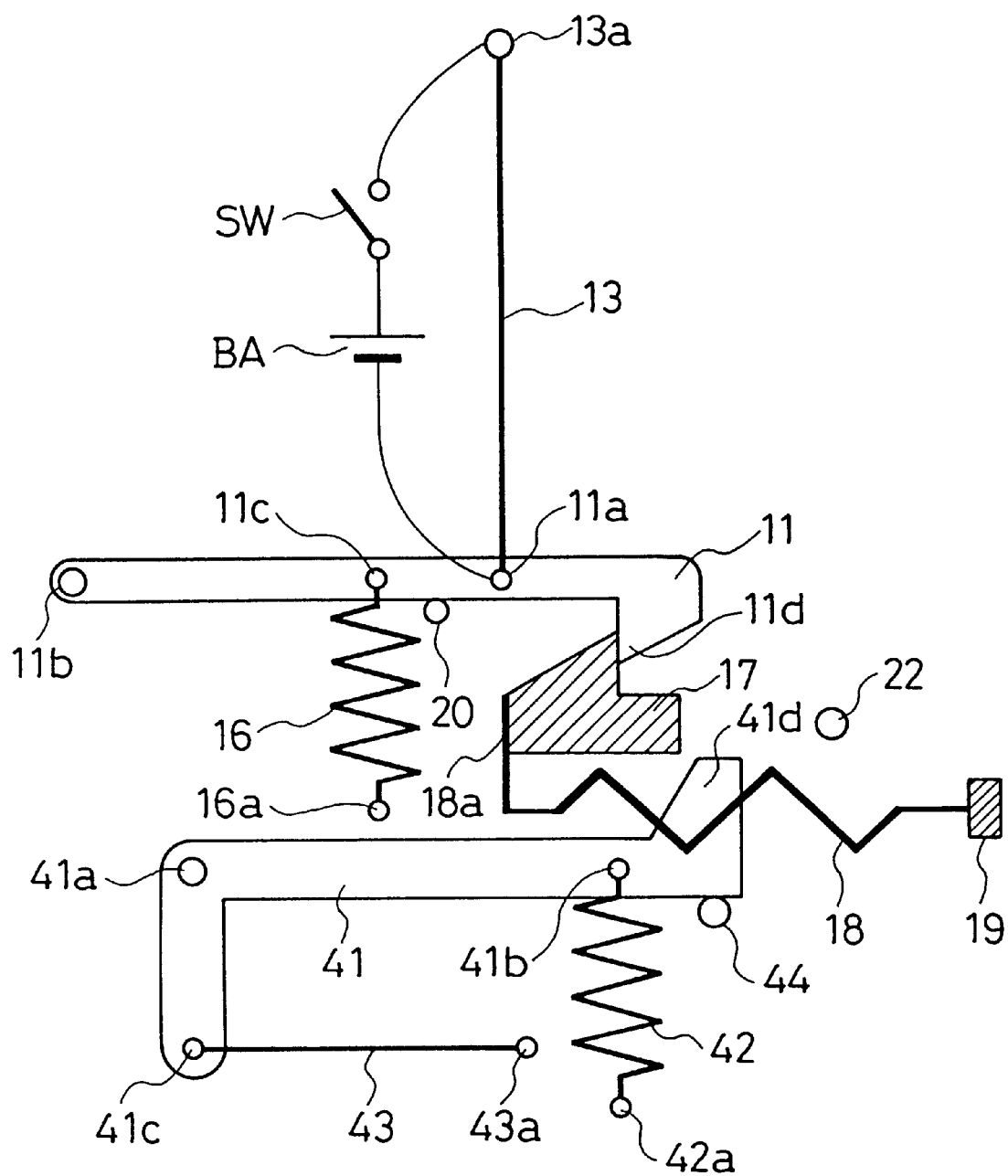
FIG. 8 is a view for illustrating a third preferred embodiment of the actuator applied with the shape memory alloy.
Figure 9:
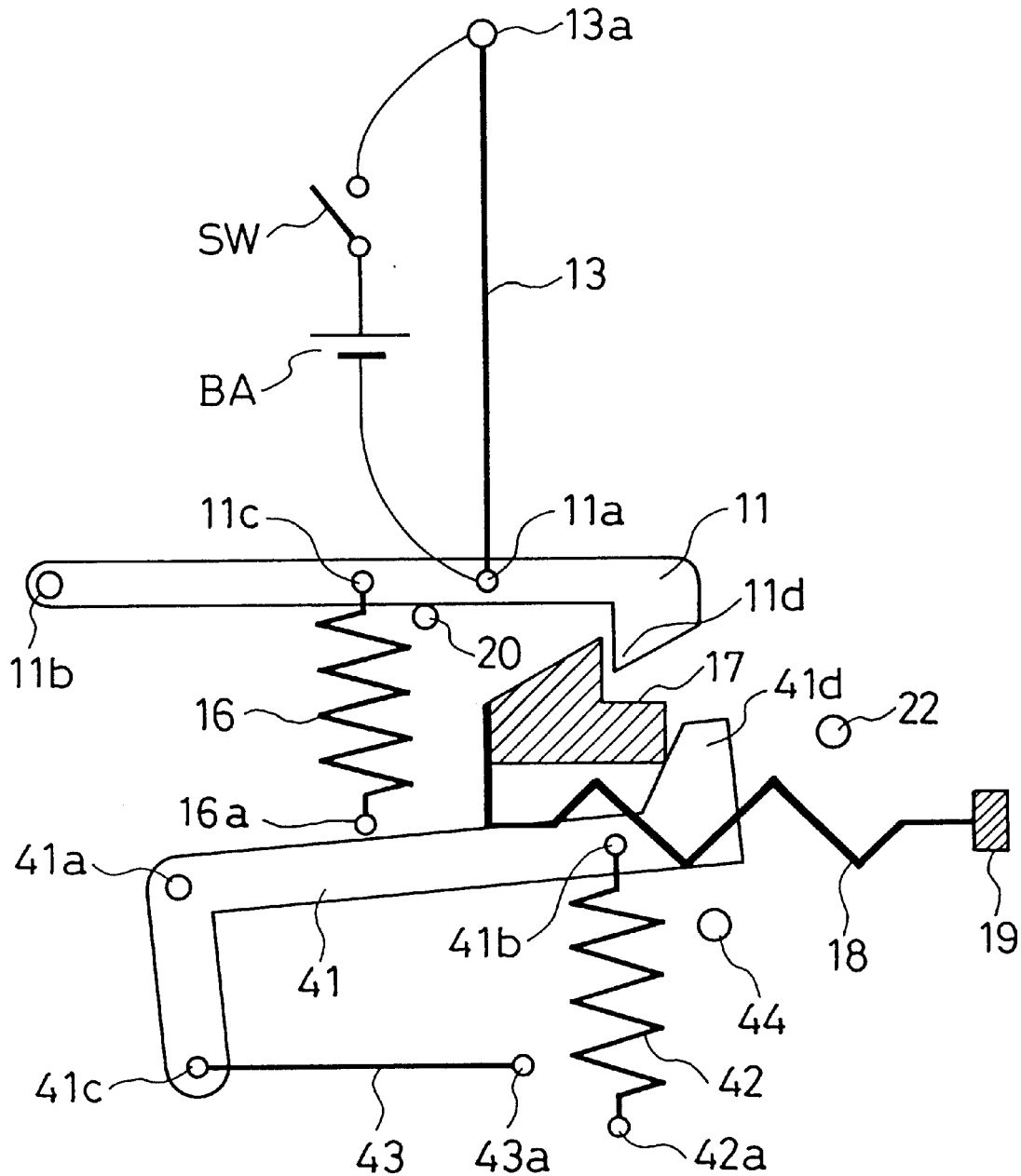
FIG. 9 is a view for illustrating a state of the actuator shown in FIG. 8 when an ambient temperature exceeds a transformation temperature of shape memory alloy.

FIGS. 8 and 9 show an actuator applied with an acting member of shape memory alloy for engaging/releasing the charge lever, wherein there is provided an operation invalidating mechanism. The same members as those of the composing elements of the first preferred embodiment are denoted by the same reference numerals in order to facilitate their reference and so their detailed description will be omitted.

Referring now to FIGS. 8 and 9, the constitution and operation of this preferred embodiment will de described as follows. Reference numeral 11 denotes an engaging lever; 17 denotes a charge lever; 16 a spring for pulling the engaging lever 11; 18 a running spring for pulling the charge lever 17; and 19 a fixed member for fixing one end of the running spring 18. In addition, 41 denotes a stopper lever and 42 denotes a spring.

The engaging lever 11 is rotatably supported around the shaft 11b, and between the pin 11a on the engaging lever 11 and the fixed pin 13a is suspended a wire 13 of shape memory alloy of the first acting member. To both ends of the wire 13 of shape memory alloy are connected in series the switch SW and the power supply BA. When the switch SW is closed, the electrical current is flowed from the power supply BA to the wire 13 of shape memory alloy to generate heat through resistance of the wire itself. It is assumed that a predetermined shrunk shape is memorized in the wire 13 of shape memory alloy.

In addition, between the pin 11c on the engaging lever 11 and the fixed pin 16a is suspended the spring 16. The engaging lever 11 is biased by the spring 16 to turn around the shaft 11b in a clockwise direction, abutted against the stopper pin 20 and stopped there.

To the charge lever 17 is fixed one end 18a of the running spring 18 and the other end 18b of the running spring 18 is fixed to the fixed member 19. Under an initial state, the charge lever 17 is moved in a leftward direction as viewed in FIG. 8 by a charge mechanism not shown, engaged with the engaging claw 11d at the extremity end of the engaging lever 11, engaged at a position shown in FIG. 8 and then the running spring 18 is biased in this state.

It is assumed that the stopper lever 41 is formed into a substantial L-shape and rotatably supported around the fixed pin 41a, a wire 43 of shape memory alloy of a third acting member for temperature compensating operation is suspended between one end 41c and the fixed pin 43a, and a predetermined shrunk shape is memorized in advance in the wire 43.

In addition, between the pin 41b on the stopper lever 41 and the fixed pin 42a is suspended a spring 42, and the stopper lever 41 is abutted against the stopper pin 44 and stopped there. One end 41d of the stopper lever 41 is constructed such that it can be advanced into/retracted from a moving locus of the charge lever 17.

It is assumed that the wire 43 of shape memory alloy of the third acting member is made of material having the same transformation temperature characteristic of the wire 13 of shape memory alloy of the first acting member or a transformation temperature characteristic transformed at a lower temperature than the former one. An invalidating mechanism for invalidating not intended movement of the charge lever 17 caused by the transformation of the wire 13 of shape memory alloy of the first acting member is constituted by the stopper lever 41, the spring 42 and the wire 43 of shape memory alloy.

Next, referring now to FIGS. 8 and 9, its operation will be described. At first, at the normal ambient temperature where an ambient temperature is less than a transformation temperature of the wire 43 of shape memory alloy of the third acting member constituting the operation invalidating mechanism, the stopper lever 41 does not perform any function, but performs the quite same operation as that of the conventional actuator described as a prior art.

That is, when the switch SW is turned on, an electrical current is supplied from the power supply BA to the wire 13 of shape memory alloy of the first acting member, and the wire 13 of shape memory alloy generates heat and its temperature is increased more than the transformation temperature, the wire 13 of shape memory alloy is transformed to a memorized predetermined shrunk shape against a biasing force of the spring 16, the engaging lever 11 is turned around the shaft 11b in a counterclockwise direction.

Although the engaging claw 11d of the engaging lever 11 is released from the charge lever 17, the extremity end 41d of the stopper lever 41 is retracted outside the moving locus of the charge lever 17, resulting in that the charge lever 17 is moved in a rightward direction as viewed in FIG. 8 by a biasing force of the running spring 18, it is abutted against the stopper pin 22 and stopped there.

As the switch SW is turned off to shut off the supplying of electrical current to the wire 13 of shape memory alloy, the wire 13 of shape memory alloy is cooled, the engaging lever 11 is turned in a clockwise direction by a biasing force of the spring 16, and the engaging claw 11d at the extremity end is returned back to the engageable position. The charge lever 17 is moved again in a leftward direction as viewed in FIG. 8 by the charge mechanism not shown, engaged with the engaging claw 11d at the extremity end of the engaging lever and returned to its initial state and at the same time the biasing spring 18 is biased.

Next, there will be described a case in which an ambient temperature exceeds a transformation temperature of the wire 43 of shape memory alloy of the third acting member constituting the operation invalidating mechanism. FIG. 9 shows a case in which an ambient temperature exceeds a transformation temperature of the wire 43 of shape memory alloy. The wire 43 of shape memory alloy is transformed to a memorized predetermined shrunk shape against the biasing force of the spring 42, the stopper lever 41 is turned around the shaft 41a in a counterclockwise direction. With such an arrangement as above, the extremity end 41d of the stopper lever 41 advances into a moving locus of the charge lever 17 and comes to a position where it prevents the motion of the charge lever 17.

Accordingly, even if the temperature of the wire 13 of shape memory alloy of the first acting member is increased more than the transformation temperature, the wire 13 has transformed into the memorized predetermined shrunk shape, and the engaging claw 11d of the engaging lever 11 is disengaged from the charge lever 17, the extremity end 41d of the stopper lever 41 prevents the charge lever 17 from being run and no malfunction occurs.

Fourth Preferred Embodiment

A fourth preferred embodiment of the present invention provides a solving means of the second problem of the present invention in which a shortening of life time caused by an excessive stress applied to the acting member of shape memory alloy is solved by adjusting a stress applied to the acting member of shape memory alloy in response to an ambient temperature.

That is, the actuator of the fourth preferred embodiment is an actuator provided with a stress adjusting mechanism in which a stress applied to the acting member of shape memory alloy is set to be low when the ambient temperature is a low temperature and in turn the stress is set to be high when the ambient temperature is a high temperature.

Figure 10:
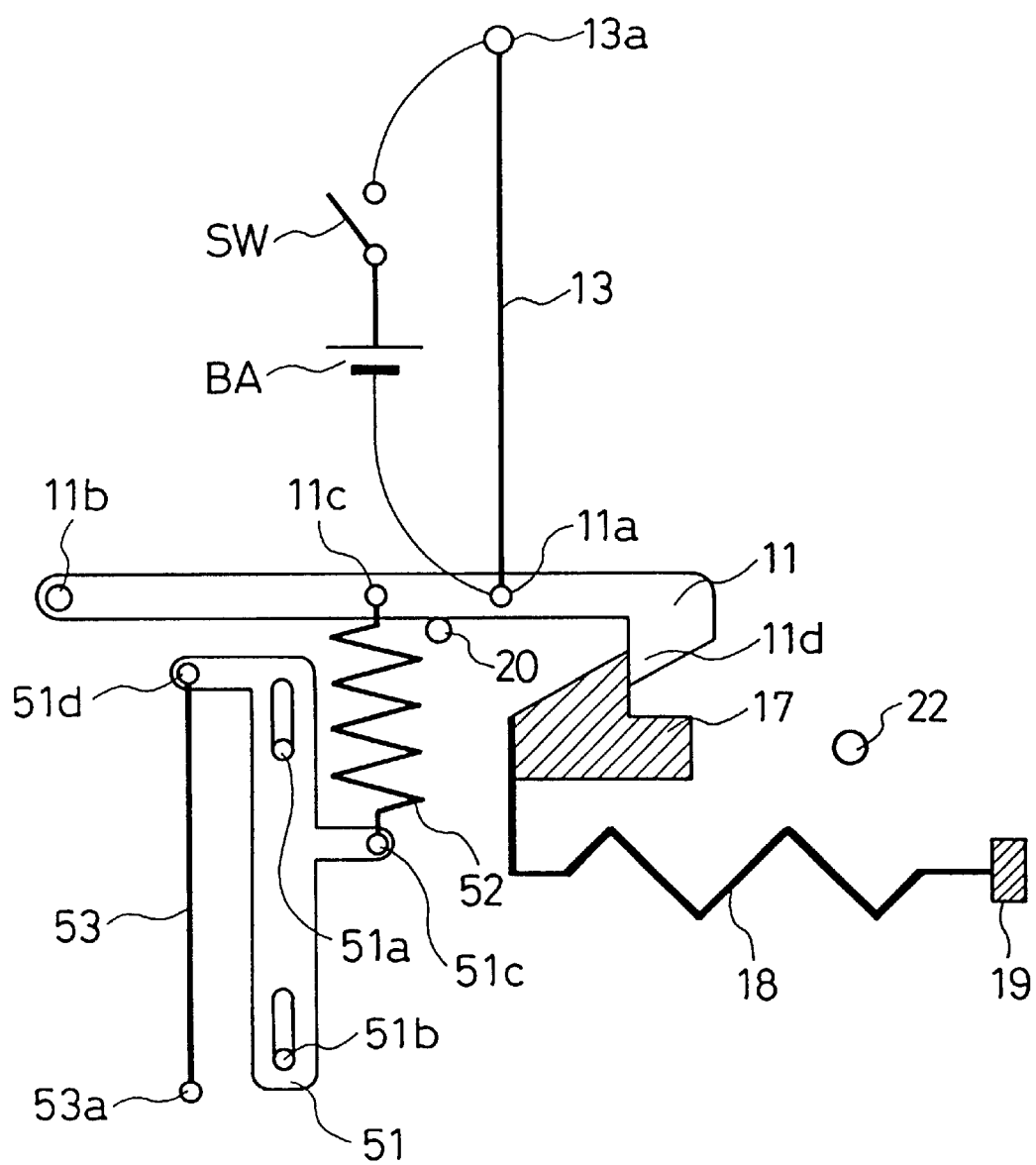
FIG. 10 is a view for illustrating a fourth preferred embodiment of the actuator applied with a shape memory alloy.
Figure 11:
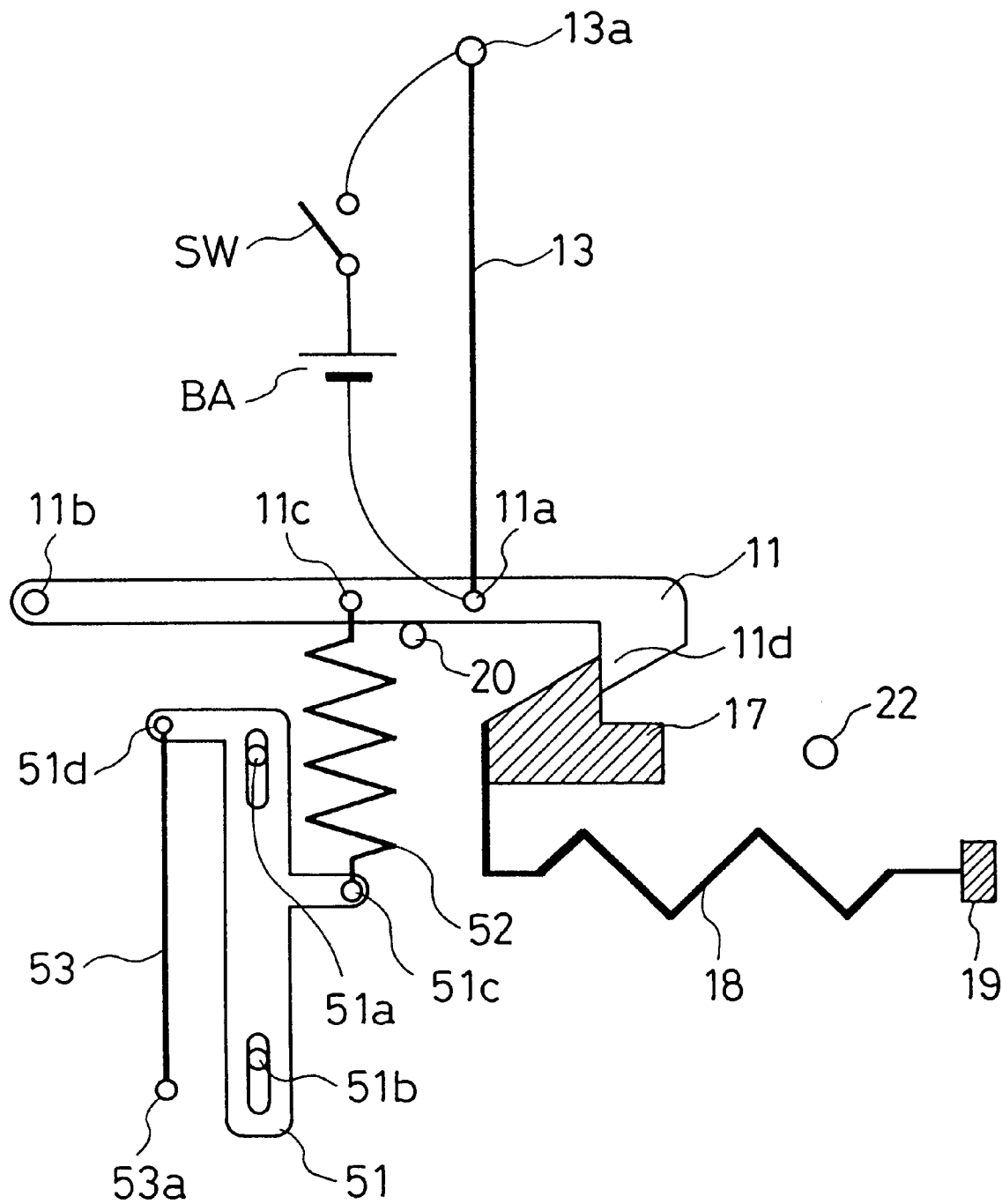
FIG. 11 is a view for illustrating a state of the actuator shown in FIG. 10 when an ambient temperature exceeds a transformation temperature of shape memory alloy.

Referring now to FIGS. 10 and 11, its constitution and operation will be described as follows. In addition, the same component parts as those of the actuator described above are denoted by the same reference numerals and their detailed description will be omitted and a stress adjusting mechanism will be described as follows.

Reference numeral 11 denotes an engaging lever; 17 a charge lever; 52 a spring for pulling the engaging lever 11; 18 a running spring for pulling the charge lever 17; and 19 a fixed member for fixing one end of the running spring 18.

The engaging lever 11 is rotatably supported around the shaft 11b. Between the pin 11a on the engaging lever 11 and the fixed pin 13a is suspended the wire 13 of shape memory alloy of the first acting member. To both ends of the wire 13 of shape memory alloy are connected in series the switch SW and the power supply BA and heat is generated through resistance of the wire itself. It is assumed that a predetermined shrunk shape is memorized in advance at the wire 13 of shape memory alloy.

Reference numeral 51 denotes a pressure adjusting slider which is slidably held in an upward or downward direction as viewed in FIG. 10 by the pins 51a, 51b arranged at the fixed member on a frame not shown. Between the pin 51c on the stress adjusting slider 51 and the pin 11c on the engaging lever 11 is suspended a spring 52, the engaging lever 11 is biased by the spring 52 in such a way that it can be rotated around the shaft 11b in a clockwise direction, abutted against the stopper pin 20 and stopped there.

In addition, between the pin 51d on the stress adjusting slider 51 and the fixed pin 53a on a frame not shown is suspended the wire 53 of shape memory alloy of the second acting member for use in adjusting stress. It is assumed that a predetermined shrunk shape is memorized in advance at the wire 53 of shape memory alloy.

A stress adjusting mechanism is constituted by the stress adjusting slider 51 and the wire 53 of shape memory alloy of the second acting member. This stress adjusting mechanism may adjust a stress generated at the wire 13 of shape memory alloy of the first acting member in response to the ambient temperature.

As the wire 53 of shape memory alloy of the second acting member is constituted by material which is not transformed at the low temperature region less than temperature TL in FIG. 3, and it starts a transformation when an ambient temperature exceeds temperature LA in FIG. 3, and further it is set such that it is transformed at low temperature than that of the wire 13 of shape memory alloy of the first acting member.

Next, its operation will be described. At first, the case in which an ambient temperature is in a normal temperature region will be described. When the ambient temperature is in a normal temperature region, in a low temperature region less than the temperature TL in FIG. 3, for example, the wire 53 of shape memory alloy for adjusting a stress is not deformed, so that the stress adjusting slider 51 is placed at an upper limit position shown in FIG. 10 and it performs a quite same operation as that of a conventional actuator.

That is, when the switch SW is turned on, an electrical current is supplied from the power supply BA to the wire 3 of shape memory alloy of the acting member to generate heat, and in turn when the temperature is increased more than the transformation temperature, the wire 13 of shape memory alloy is transformed to a memorized predetermined shrunk shape against a biasing force of the spring 52, the engaging lever 11 is turned around the shaft 11b in a counterclockwise direction. The engaging claw 11d of the engaging lever 11 is released from the charge lever 17, the charge lever 17 is moved in a rightward direction as viewed in FIG. 10 by a biasing force of the running spring 18 to perform a predetermined operation, it is abutted against the stopper pin 22 and stopped there.

At this time, since the tension force acted upon the wire 13 of shape memory alloy of the first acting member is set at the initial set value by the spring 52 to generate a relative low stress, the transformation starting temperature of the wire 13 of shape memory alloy is also low and then the actuator can be operated at a relative low temperature region as indicated in the operating region M shown in FIG. 3, for example.

Next, there will be described a case in which the ambient temperature is increased to exceed the normal ambient temperature. When the ambient temperature is increased to exceed the transformation temperature (for example, the temperature LA in FIG. 3) of the wire 53 of shape memory alloy for adjusting stress, the wire 53 of shape memory alloy for adjusting stress is transformed into the memorized shrunk shape to pull the stress adjusting slider 51 toward a downward direction as viewed in FIG. 10. FIG. 11 shows a state in which the pressure adjusting slider 51 is moved in a downward direction and a tension of the spring 52 is increased.

As a result of increased tension of the spring 52, a larger tension force than the initial set value acts on the wire 13 of shape memory alloy of acting member and then the larger stress is generated at the wire 13 of shape memory alloy.

When the wire 13 of shape memory alloy of the first acting member is transformed to the shrunk shape through turning-on of the switch SW in this state, the stress generated at the wire 13 is increased, so that the transformation temperature of the wire 13 of shape memory alloy of the acting member is moved toward the higher temperature, and it is possible to operate the actuator at a relative high temperature region as indicated in the operating region H in FIG. 3, for example.

That is, in accordance with this stress adjusting mechanism, it is possible to reduce the stress generated at the wire 13 of shape memory alloy of the first acting member at the low temperature region and to extend a life time, and in the case of high temperature region, it is member not shown and the pin 11c on the engaging lever 11. Reference numeral 55 denotes a wire of shape memory alloy for use in adjusting stress and this wire is suspended in parallel with the spring 56 between the pin 55a arranged at the fixed member not shown and the pin 11a on the engaging lever 11.

The wire 55 of shape memory alloy of the second acting member for adjusting stress is suspended under a state in which it is extended from the memorized shape at the normal temperature region and a tension is added, both a tension of the wire 55 of shape memory alloy for adjusting stress and a biasing force of the spring 56 are acted simultaneously on the wire 13 of shape memory alloy of the first acting member to generate a stress.

It is assumed that the wire 55 of shape memory alloy of the second acting member for adjusting stress is constituted by material having the same transformation temperature characteristic as that of the wire 13 of shape memory alloy of the first acting member or having a transformation temperature characteristic transformed at a lower temperature than that of the former, and predetermined shrunk shape is memorized in advance.

Next, its operation will be described as follows. If the ambient temperature is the normal ambient temperature, possible to increase a stress at the high temperature region, move the transformation temperature of the wire 13 of shape memory alloy of the acting member toward a higher value and expand a requisite operating temperature range.

Figure 12:
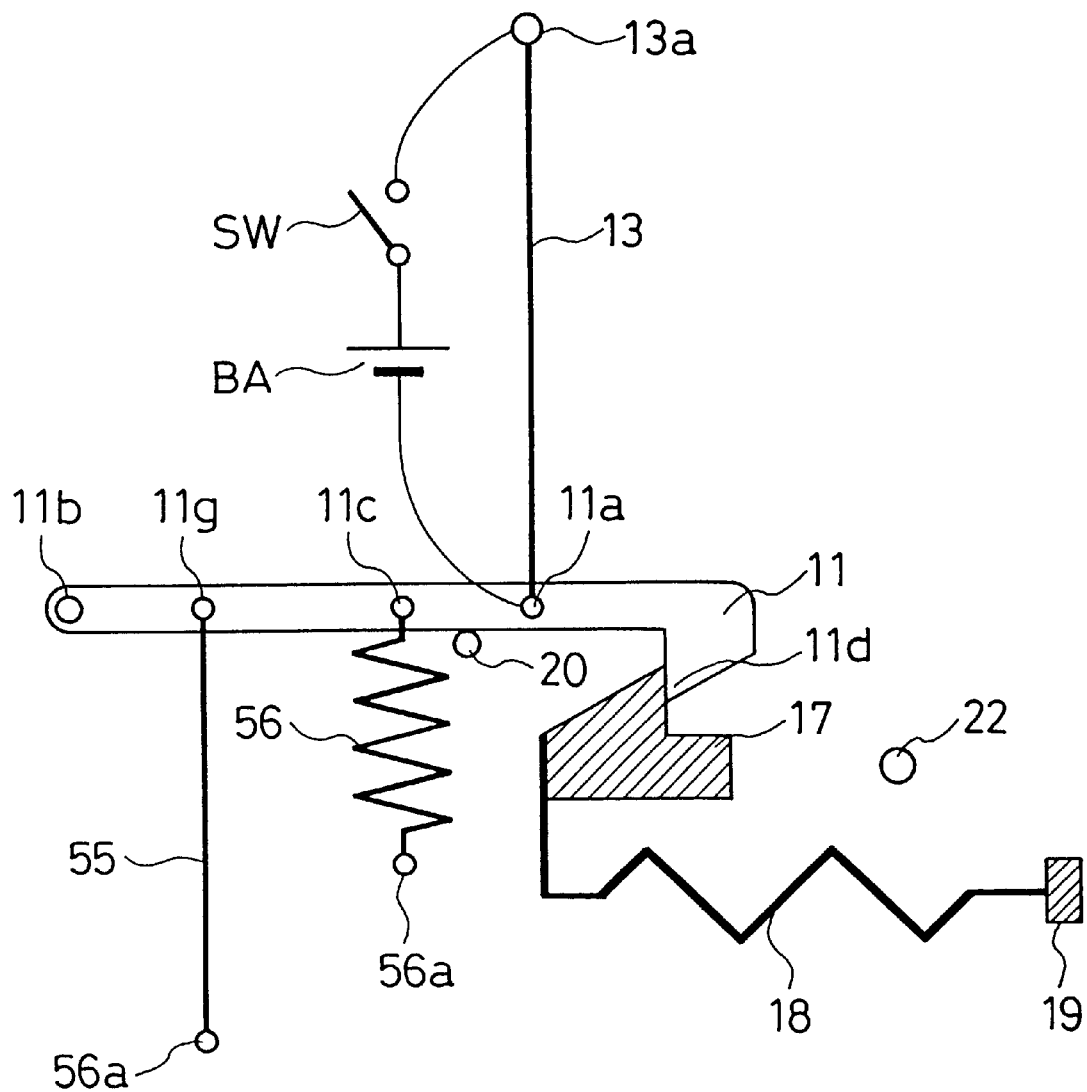
FIG. 12 is a view for illustrating an example of modification in which a stress adjustment mechanism of the actuator of a fourth preferred embodiment shown in FIG. 10 is constituted only with wire of shape memory alloy.

FIG. 12 is a view for showing an example in which the stress adjusting mechanism is constituted only with the wire of shape memory alloy for use in adjusting stress. It is well known in the wire of shape memory alloy as its characteristic to have a low resilient repelling force at the normal temperature region and to cause the resilient repelling force to be increased at the temperature region. exceeding the transformation temperature. The stress adjusting mechanism shown in FIG. 12 utilizes the aforesaid characteristic in which the member of shape memory alloy may also act as a resilient member.

Referring now to FIG. 12, its constitution and operation will be described as follows. The same component members as those of the actuator described above are denoted by the same reference numerals and their detailed description will be omitted and then the stress adjusting mechanism will be described.

Reference numeral 56 denotes a spring for pulling the engaging lever 11 in a downward direction, the spring 56 being suspended between the pin 56a arranged at the fixed a low tension is applied to the wire 13 of shape memory alloy of the first acting member through the engaging lever 11 due to the fact that a tension generated by the wire 55 of shape memory alloy for adjusting stress is low, resulting in that a stress generated at the wire 13 is low.

When the ambient temperature is increased to exceed the transformation temperature of the wire 55 of shape memory alloy, a tension caused by the wire 55 of shape memory alloy of the second acting member for adjusting stress is increased. Due to this fact, a high tension is added to the wire 13 of shape memory alloy of the first acting member through the engaging lever 11 to increase the stress generated at the wire 13 and a transformation temperature of the wire 13 of shape memory alloy of the acting member is also moved to a higher value.

That is, an application of this stress adjusting mechanism also enables the stress generated at the wire 13 of shape memory alloy of the acting member to be decreased at the low temperature region and to extend its life time, and in turn at the high temperature region, this mechanism enables the generated stress to be increased, the transformation temperature of the wire of shape memory alloy to be shifted to a higher value and then a requisite operating temperature range to be expanded.

Fifth Preferred Embodiment

A fifth preferred embodiment relates to an actuator in which the stress adjusting mechanism described in reference to FIGS. 10 and 11 is coupled to the actuator applied with shape memory alloy for engaging/releasing of the charge lever illustrated in reference to FIGS. 1 and 2.

Since each of the constitutions has already been described, the same component parts as those of the previous embodiments are denoted by the same reference numerals, their detailed description will be omitted and so referring to FIGS. 13 to 16, a constitution and an operation of the actuator in which both of them are connected to each other will be described.

The engaging lever 11 is rotatably supported around a shaft 11b, wherein between the pin 11a on the engaging lever 11 and the pin 12a on the temperature compensating lever 12 is suspended the wire 13 of shape memory alloy of the first acting member.

It is constructed such that the switch SW and the power supply BA are connected in series to both ends of the wire 13 of shape memory alloy and the wire itself is heated through supplying of electrical power to the wire 13. It is assumed that a predetermined shrunk shape is memorized in advance in the wire 13 of shape memory alloy of the first acting member.

In addition, the engaging lever 11 is biased by the spring 52 to turn around the shaft 11b in a clockwise direction and abutted against the stopper pin 20 and stopped there.

Figure 13:
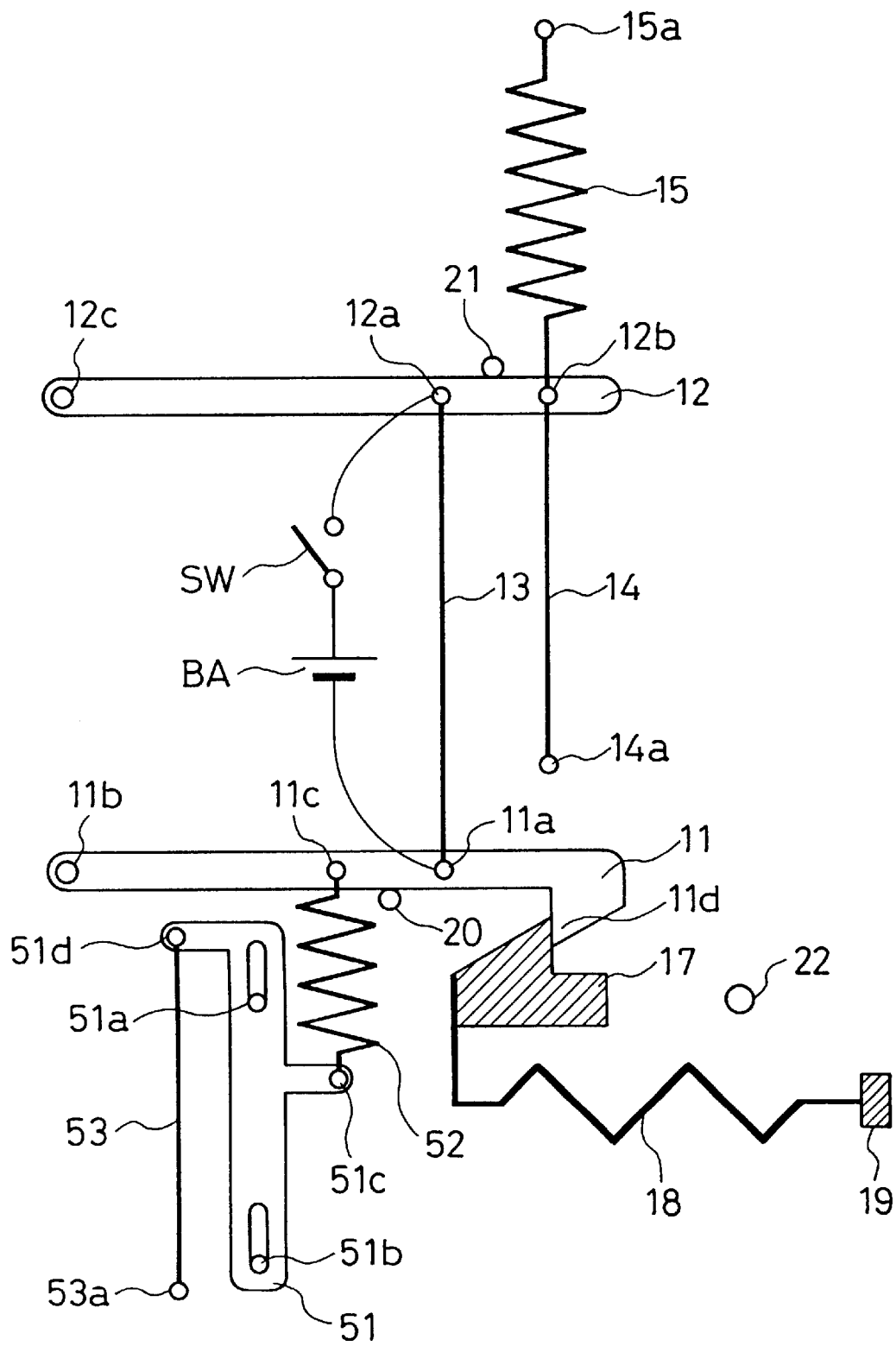
FIG. 13 is a view for illustrating a fifth preferred embodiment of the actuator applied with a shape memory alloy.

The charge lever 17 is moved in a leftward direction as viewed in FIG. 13 by the charge mechanism not shown under its initial state, engaged with the engaging claw 11d of the engaging lever 11 and the running spring 18 is biased in this state.

The temperature compensating lever 12 is rotatably supported around the shaft 12c and a wire 14 of shape memory alloy of the third acting member for compensating temperature is suspended between the pin 12b on the temperature compensating lever 12 and the fixed pin 14a. The temperature compensating lever 12 is biased by a spring 15 to turn around the shaft 12c in a counterclockwise direction, abutted against the stopper pin 21 and stopped there.

The temperature compensating mechanism is constituted by the temperature compensating lever 12, the wire 14 of shape memory alloy of the third acting member for compensating temperature and the spring 15.

Reference numeral 51 denotes a stress adjusting slider which is slidably held by the pins 51a, 51b arranged at the frame not shown in an upward or downward direction as viewed in FIG. 13. Between the pin 51c on the stress adjusting slider and the pin 11c on the engaging lever 11 is suspended a spring 52, and further between the pin 51d on the stress adjusting slider 51 and the fixed pin 53a is suspended the wire 53 of shape memory alloy of the second acting member for adjusting stress. A predetermined shrunk shape is memorized in advance in the wire 53 of shape memory alloy.

The wire 13 of shape memory alloy of the first acting member is constituted by material having a transformation temperature characteristic operated in the operating region M shown in FIG. 3, and the wire 14 of shape memory alloy of the third acting member of the temperature compensating mechanism is constituted by material having a transformation temperature characteristic operated in the operating region M or H, and the wire 53 of shape memory alloy of the second acting member for adjusting stress is constituted by material having a transformation temperature characteristic operated in the operating region L.

Next, its operation will be described as follows. In the case that the ambient temperature is in a normal ambient temperature, for example, in a low temperature region less than a temperature TL shown in FIG. 3, the wire 53 of shape memory alloy of the second acting member for adjusting stress is not transformed, so that the stress adjusting slider 51 is placed at its upper limit position shown in FIG. 1, a tension force in which the spring 52 attracts the engaging lever 11 is at its initial set value and performs the quite same operation as that of a conventional actuator.

That is, when the switch SW is turned on, an electrical current is supplied from the power supply BA to the wire 13 of shape memory alloy of the first acting member to generate heat, and when the temperature is increased more than the transformation temperature, the wire 13 of shape memory alloy is transformed into the memorized shrunk shape against the biasing force of the spring 52, the engaging lever 11 is turned around the shaft 11b in a counterclockwise direction.

Figure 14:
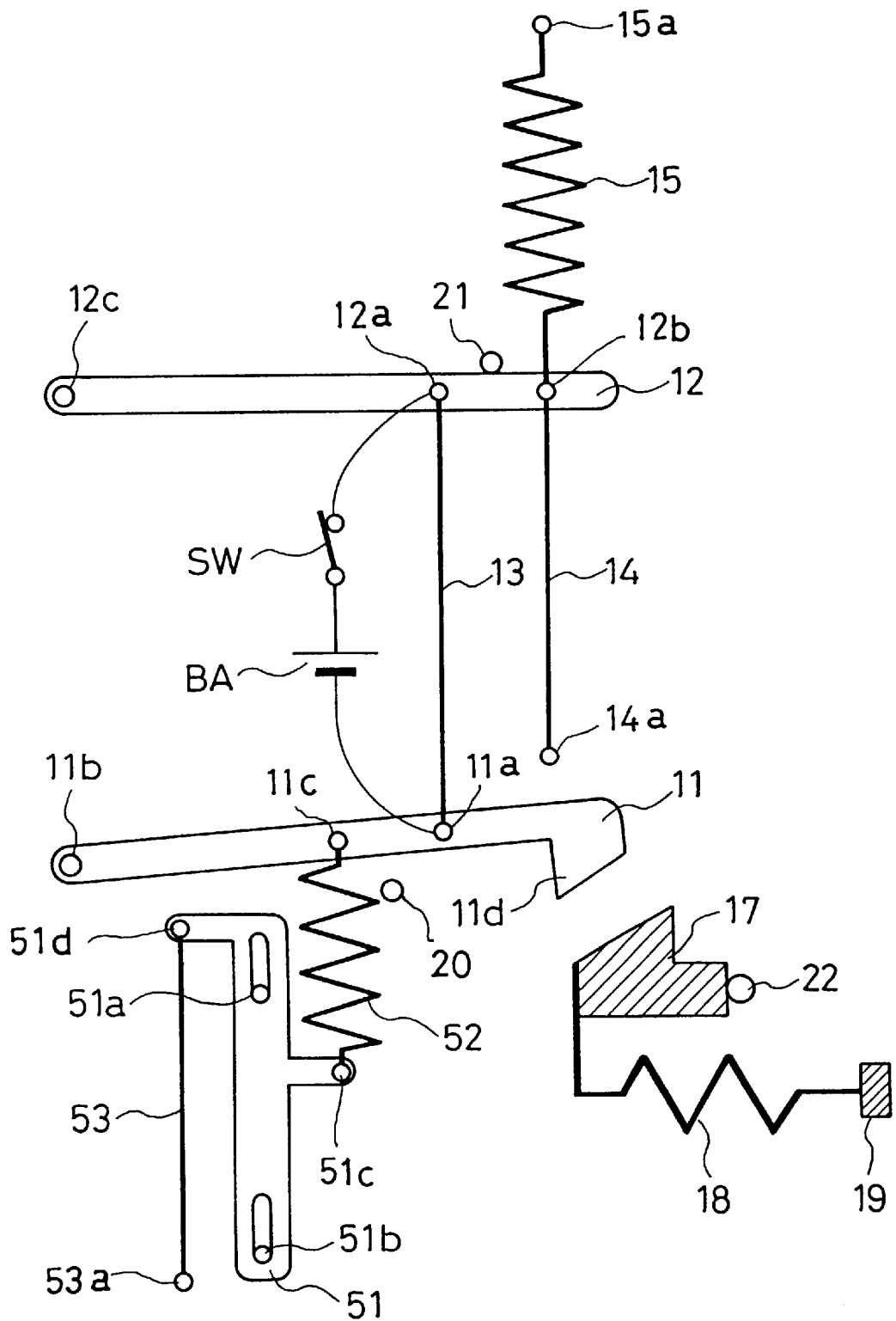
FIG. 14 is a view for illustrating an operating state of the actuator shown in FIG. 13 at a normal ambient temperature.

The engaging claw 11d of the engaging lever 11 is released from the charge lever 17, the charge lever 17 is moved in a rightward direction as viewed in FIG. 13 by a biasing force of the running spring 18 to perform a predetermined operation, abutted against the stopper pin 22 and stopped there. FIG. 14 shows this state.

To the wire 13 of shape memory alloy of the first acting member is acted a tension force of initial set value pulling the engaging lever 11 in a downward direction under the action of the spring 52, and a relative low stress is generated there, so that the life of the wire 13 of shape memory alloy is not shortened.

When the ambient temperature is increased to exceed the transformation starting temperature of the wire 53 of shape memory alloy of the second acting member for adjusting stress (for example, the temperature LA in FIG. 3), the wire 53 is transformed to the memorized shrunk shape to pull the stress adjusting slider 51 in a downward direction so as to cause the tension force applied to the spring 52 to be increased more than the initial set value. Even in this state, engaging/releasing of the charge lever 17 with the engaging lever 11 are carried out in the quite same manner as that under the normal ambient temperature.

Figure 15:
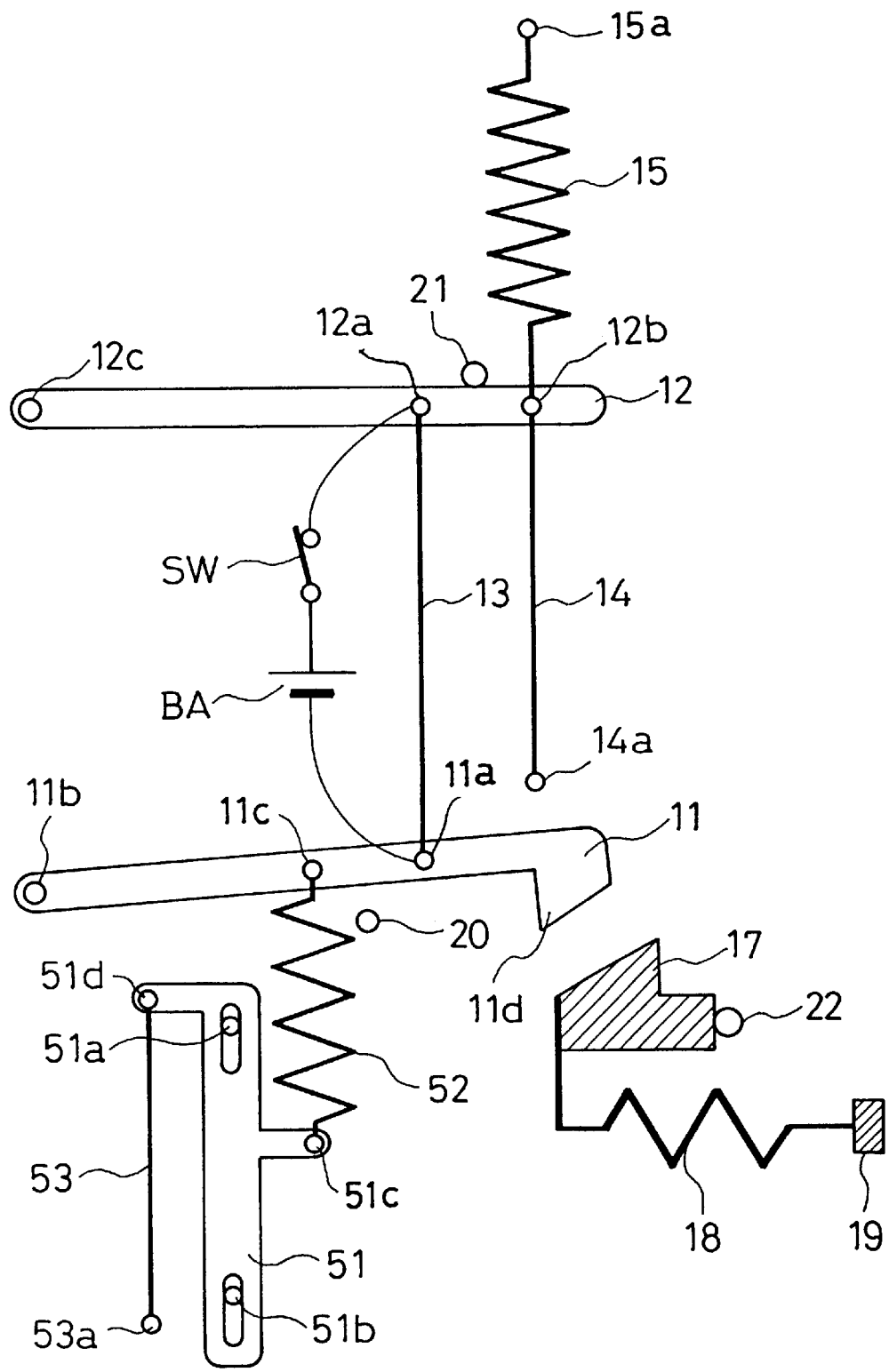
FIG. 15 is a view for illustrating an operating state of the stress adjustment mechanism shown in FIG. 13.

FIG. 15 shows a state in which the stress adjusting slider 51 is pulled in a downward direction under a transformation of the wire 53 of shape memory alloy of the second acting member for stress adjustment, a tension force applied to the spring 52 is increased more than the initial set value, i.e. the operation when a high stress is generated at the wire 13 of shape memory alloy of the first acting member. At this time, the wire 14 of shape memory alloy of the third acting member constituting the temperature compensating mechanism is not transformed into the memorized shrunk shape and the temperature compensating mechanism is not operated.

That is, when the switch SW is turned on, an electrical current is supplied from the power supply BA to the wire 13 of shape memory alloy of the first acting member to generate heat and when its temperature is increased more than the transformation temperature, the wire 13 of shape memory alloy is transformed to the memorized shrunk shape against the biasing force of the spring 52, and the engaging lever 11 is turned around the shaft 11b in a counterclockwise direction.

The engaging claw 11d of the engaging lever 11 is released from the charge lever 17, the charge lever 17 is moved in a rightward direction as viewed in FIG. 15 by the biasing force of the running spring 18 to perform a predetermined operation, and then it is abutted against the stopper pin 22 and stopped there.

Figure 16:
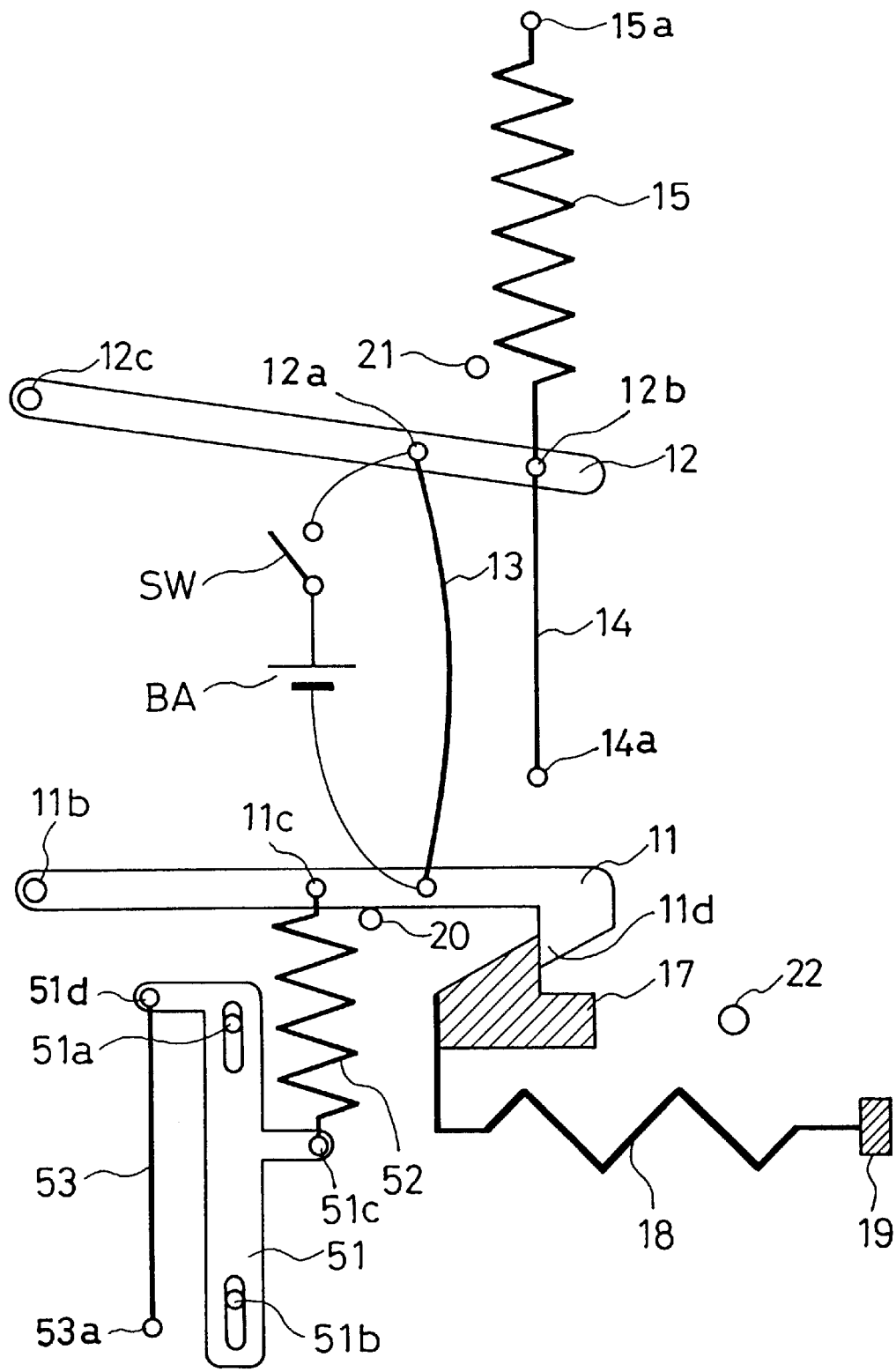
FIG. 16 is a view for showing a state of the actuator shown in FIG. 13 when the ambient temperature exceeds a transformation temperature of shape memory alloy and the temperature compensating mechanism is operated.
Figure 17:
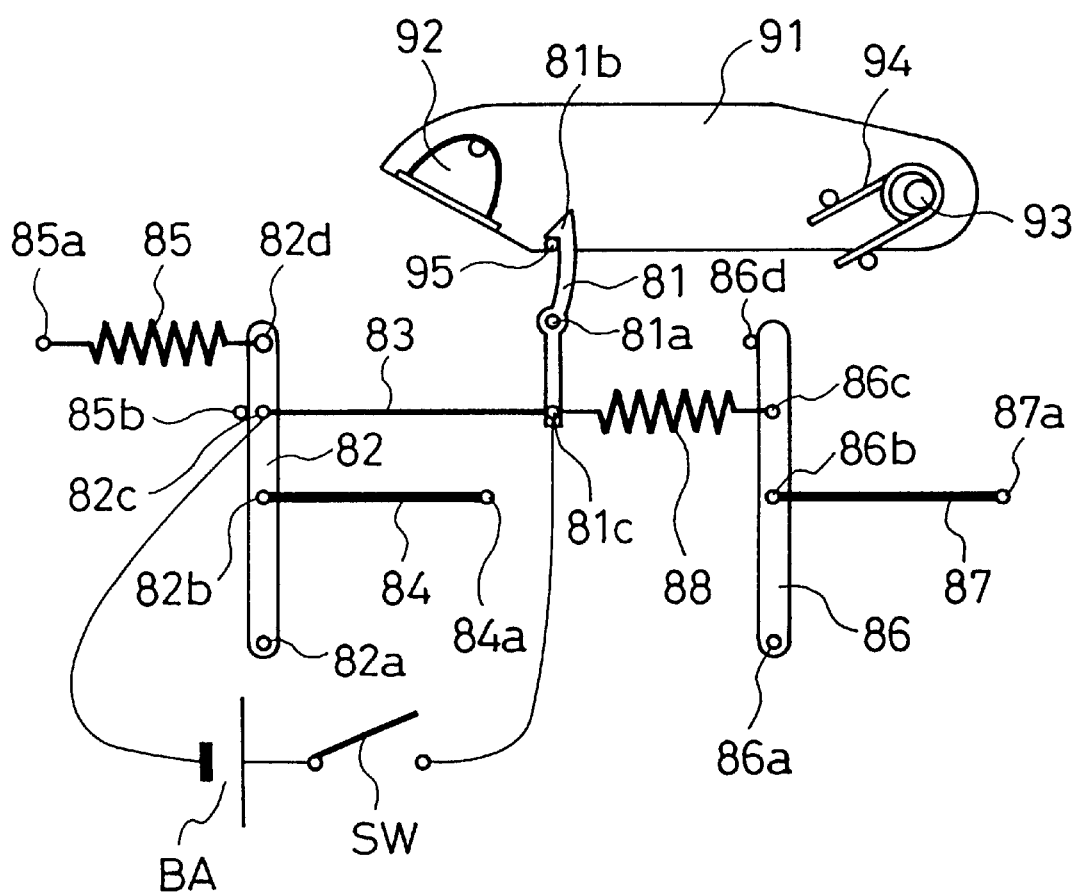
FIG. 17 is a view for illustrating a sixth preferred embodiment in which the actuator provided with the shape memory alloy is applied to a pop-up mechanism at a flash unit.

FIG. 16 is a view for showing a case in which the ambient temperature is increased more to exceed the transformation starting temperature of the wire 14 of shape memory alloy of the third acting member constituting the temperature compensating mechanism (for example, the temperature TH in FIG. 3).

In this case, the wire 13 of shape memory alloy of the first acting member is also deformed to the memorized shrunk shape due to increased ambient temperature where malfunction is produced, although in this state, as shown in FIG. 16, the wire 14 of shape memory alloy of the third acting member constituting the temperature compensating mechanism is transformed to the memorized shrunk shape against the biasing force of the spring 15, and it turns the temperature compensating lever 12 in a counterclockwise direction.

With such an arrangement as above, even if a looseness is produced at the wire 13 of shape memory alloy of the first acting member and the wire 13 is transformed to the memorized shrunk shape, the engaging lever 11 is not moved and the engaged state of the charge lever 17 is maintained, so that no malfunction is carried out.

Sixth Preferred Embodiment

FIGS. 17 to 20 are views for illustrating an example in which the actuator applied with the shape memory alloy described above is applied to the pop-up mechanism at the flash unit installed at a camera.

In FIGS. 17 to 20, reference numeral 91 denotes a flash unit provided with a light emitting section 92, wherein it is rotatably supported around the shaft 93 arranged at a camera main body not shown, it is always biased to turn in a clockwise direction by the spring 94 to occupy the pop-up position. Reference numeral 95 denotes an engaging pin arranged at the main body of the flash unit.

Reference numeral 81 denotes an engaging lever which is rotatably supported around the shaft 81a arranged at the main body of a camera not shown. The engaging claw 81b at the extremity end is engaged with the engaging pin 95 of the flash unit 91 and then the flash unit 91 is engaged at its storing position. When the engaging claw 81b is released from the engaging pin 95 by the mechanism to be described later, the flash unit 91 is turned in a clockwise direction by a biasing force of the spring 93 to occupy the pop-up position.

Reference numeral 82 denotes the temperature compensating lever which is rotatably supported around a shaft 82a arranged at the main body of the camera not shown. Between the pin 82c on the temperature compensating lever 82 and the pin 81c on the engaging lever 81 is suspended the wire 83 of shape memory alloy of the first acting member.

To both ends of the wire 83 of shape memory alloy are connected in series the switch SW and the power supply BA and then the wire itself may generate heat under supplying of the electrical power to the wire 83. It is assumed that a predetermined shrunk shape is memorized in advance at the wire 83 of shape memory alloy.

Between the pin 82b on the temperature compensating lever 82 and the fixed pin 84a arranged at the main body of a camera not shown is suspended a wire 84 of shape memory alloy of the third acting member for temperature compensation, and between the pin 82d on the temperature compensating lever 82 and the pin 85a arranged at the main body of a camera not shown is suspended a spring 85. Under the normal state, the temperature compensating lever 82 is pulled by the spring 85 and abutted against the stopper pin 85b.

The temperature compensating mechanism is constructed by the temperature compensating lever 82, wire 84 of shape memory alloy of the third acting member for temperature compensation and the spring 85.

Reference numeral 86 is a stress adjusting lever which is rotatably supported around a shaft 86a arranged at the main body of a camera not shown. Between the pin 86c on the stress adjusting lever 86 and the pin 81c on the engaging lever 81 is suspended a spring 88. Between the pin 86b on the stress adjusting lever 86 and the fixed pin 87a arranged at the main body of a camera not shown is suspended a wire 87 of shape memory alloy of the second acting member for stress adjustment. The stress adjustment lever 86 is pulled by the spring 88, abutted against the stopper pin 86d and stopped there. It is assumed that a predetermined shrunk shape is memorized in the wire 87 of shape memory alloy of the second acting member for stress adjustment.

The wire 83 of shape memory alloy of the first acting member is constituted by material having a transformation temperature characteristic operated in the operating region M shown in FIG. 3, the wire 84 of shape memory alloy of the third acting member of the temperature compensating mechanism is constituted by material having a transformation temperature characteristic operated in the operating region M or H, and the wire 87 of shape memory alloy of the second acting member for adjusting stress is constituted by material having a transformation temperature characteristic operated in the operating region L.

Next, its operation will be described as follows. In the case that the ambient temperature is in a normal ambient temperature, for example, in a low temperature region less than a temperature TL shown in FIG. 3, the wire 87 of shape memory alloy of the second acting member for adjusting stress is not transformed, so that the stress adjusting lever 86 is placed at the position shown in FIG. 17, the spring pulls the engaging lever 81 to turn around the shaft 81a in a counterclockwise direction and its tension force is set at its initial set value.

Figure 18:
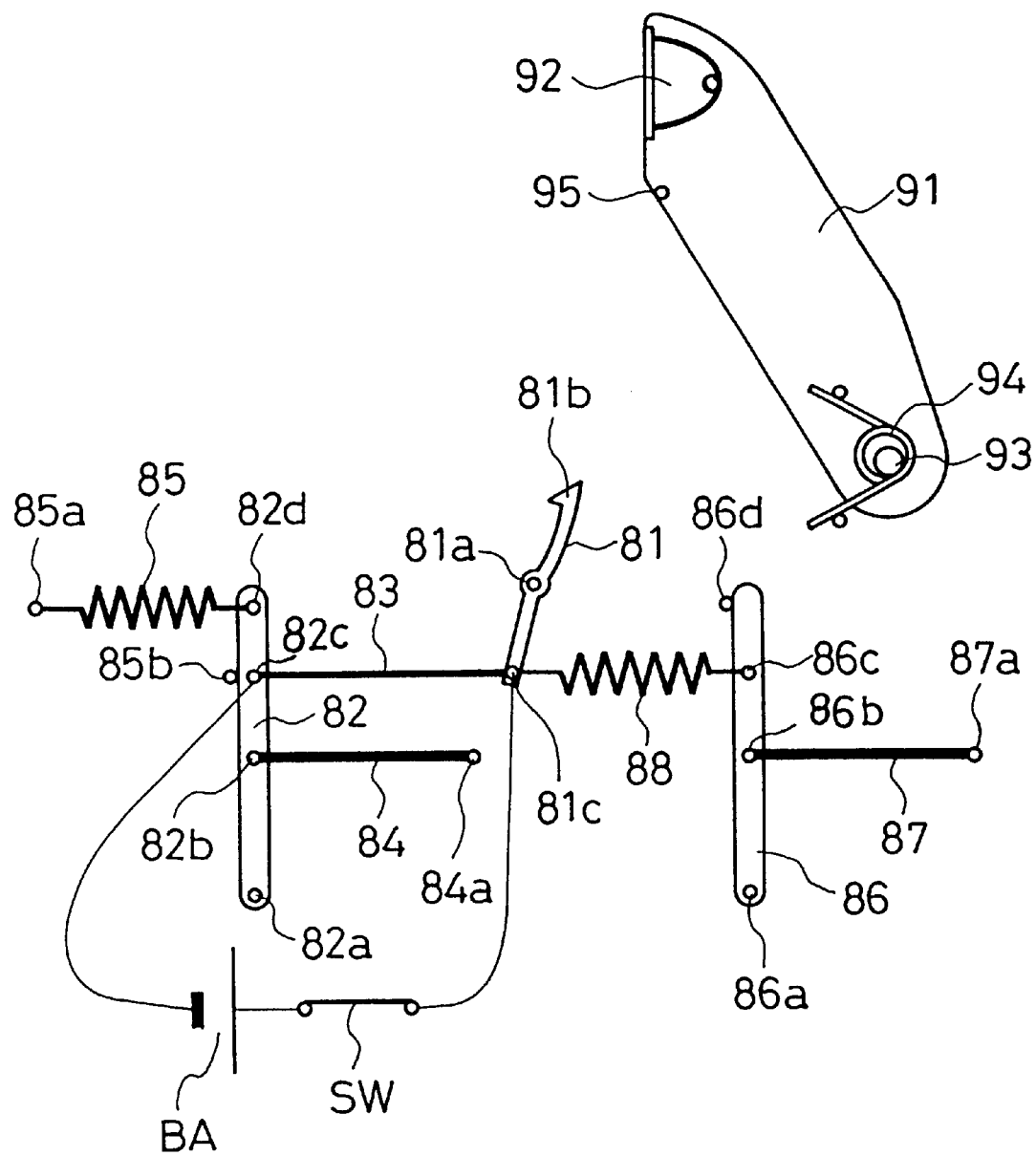
FIG. 18 is a view for illustrating an operating state of the actuator shown in FIG. 17 at a normal ambient temperature.

In this state, when the switch SW is turned on, an electrical current is supplied from the power supply BA to the wire 83 of shape memory alloy of the first acting member to generate heat, and when the temperature is increased more than the transformation temperature, the wire 83 of shape memory alloy is transformed into the memorized predetermined shrunk shape against the biasing force of the spring 88. With such an arrangement as above, the engaging lever 81 is turned around the shaft 81a in a clockwise direction. The engaging claw 81b at the extremity end is released from the engaging pin 95 of the flash unit 91, the flash unit 91 is turned in a clockwise direction by the spring 93 to occupy the pop-up position. FIG. 18 shows this state.

When the ambient temperature is increased to exceed the transformation starting temperature of the wire 87 of shape memory alloy of the second acting member for adjusting stress (for example, the temperature LA in FIG. 3), the wire 87 is transformed to the memorized shrunk shape against the biasing force of the spring 88, the stress adjusting lever 86 is turned around the shaft 86a in a clockwise direction to cause the tension force applied to the spring 88 to be increased more than the initial set value.

At this time, the wire 84 of shape memory alloy of the third acting member of the temperature compensating mechanism is not transformed to the memorized shrunk shape and then the temperature compensating mechanism is not operated.

Figure 19:
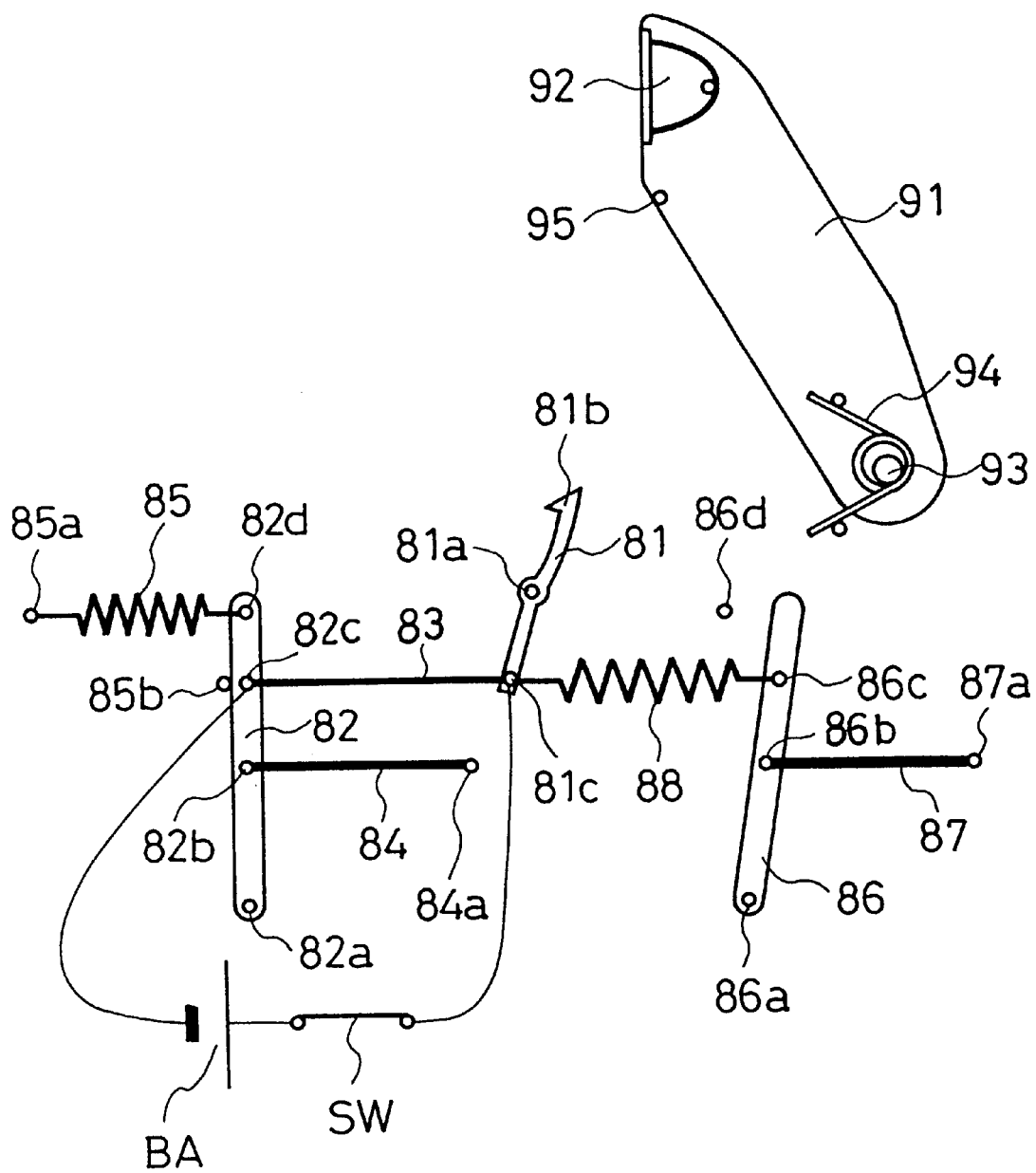
FIG. 19 is a view for illustrating an operating state of the stress adjustment mechanism shown in FIG. 17.

Even in this state, engaging/releasing of the flash unit 91 with the engaging lever 81 are carried out in the quite same manner as that under the normal ambient temperature, and the flash unit 91 is turned in a clockwise direction by the spring 93 to occupy the pop-up position. FIG. 19 shows this state.

Figure 20:
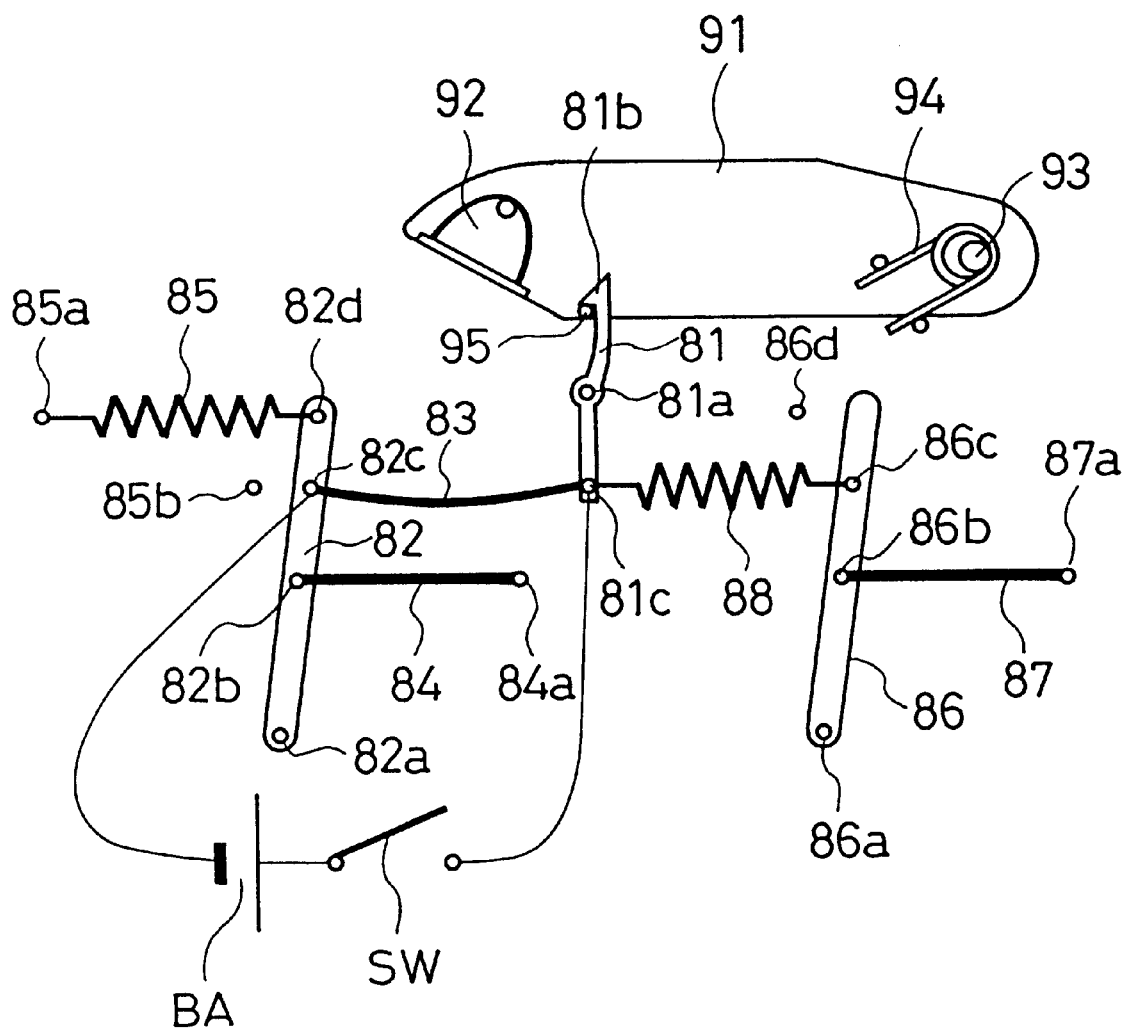
FIG. 20 is a view for showing a state of the actuator shown in FIG. 17 when the ambient temperature exceeds a transformation temperature of shape memory alloy and the temperature compensating mechanism is operated.
Figure 21:
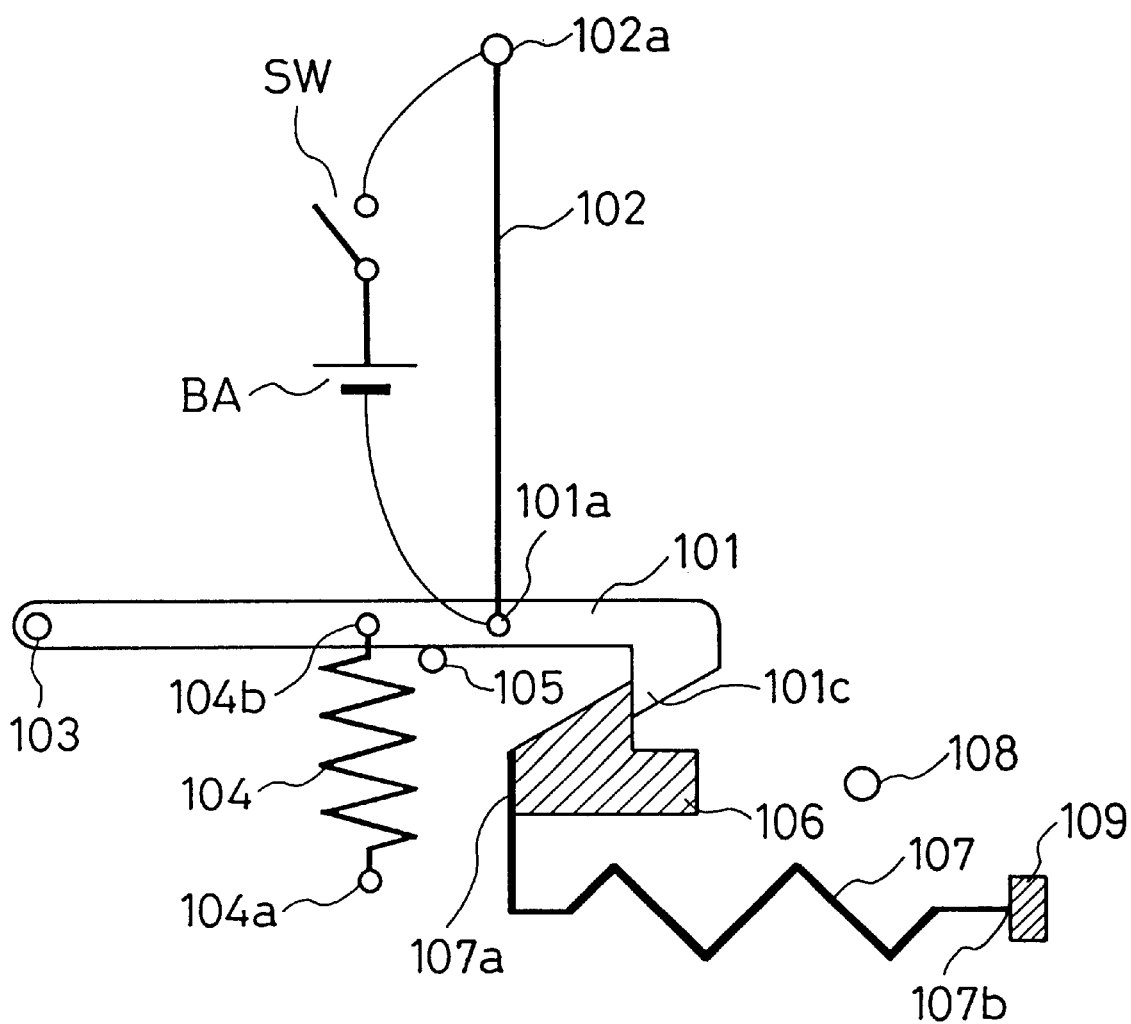
FIG. 21 is a view for illustrating a conventional actuator applied with a shape memory alloy.
Figure 22:
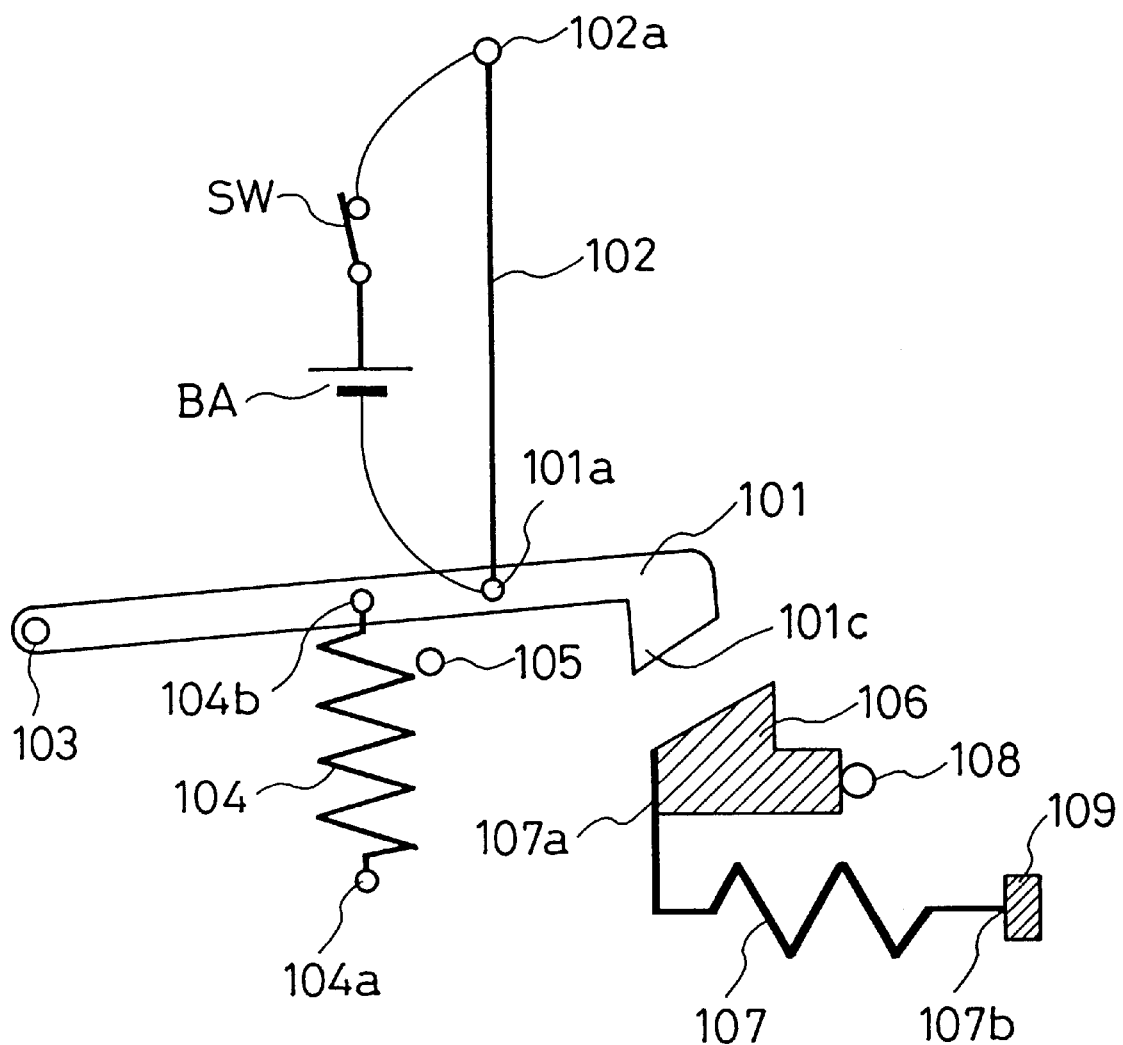
FIG. 22 is a view for illustrating an operating state of the conventional actuator shown in FIG. 21.

FIG. 20 shows a case in which the ambient temperature is further increased to exceed the transformation starting temperature (for example, the temperature HA in FIG. 3) of the wire 84 of shape memory alloy of the third acting member constituting the temperature compensating mechanism.

In this case, increased ambient temperature may also cause the wire 83 of shape memory alloy of the first acting member to be transformed to the memorized shrunk shape against the biasing force of the spring 85, and further cause the temperature compensating lever 82 to be turn around the shaft 82a in a clockwise direction by the transformation of wire 84 against the biasing force of the spring 85.

With such an arrangement as above, even if a looseness is produced at the wire 83 of shape memory alloy of the first acting member and the wire 83 is transformed to the memorized shrunk shape, the engaging lever 81 is not moved and the engaged state of the flash unit 91 with the engaging lever 81 is maintained, so that no malfunction is carried out.

As described above, in accordance with the present invention, a value of the stress added to the acting member constituted by the shape memory alloy is adjusted in response to the ambient temperature by the stress adjustment mechanism, a value of the stress can be set low at a low temperature range and a value of stress can be set high at a high temperature range, so that the operating temperature range of the actuator and at the same time a life time of the actuator can be extended.

In addition, in accordance with the present invention, even if the ambient temperature of the actuator is more than the transformation temperature of the shape memory alloy and the acting member is transformed to the memorized shape, an operation of the operating member with the acting member of shape memory alloy can be invalidated with the temperature compensating mechanism, so that even if the ambient temperature is more than the transformation temperature of the shape memory alloy, a possibility in which non-intended malfunction can be prevented in advance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An actuator comprising:

a moving member biased in a predetermined direction;

an engaging member for engaging with and stopping a movement of said moving member in the predetermined direction;

a first acting member connected to said engaging member and starting a shape transformation upon reaching a first temperature to move said engaging member to release an engaged state of the moving member with the engaging member; and a second acting member effecting an operational response upon being heated by ambient temperature to a second temperature, lower than said first temperature, the operational response of said second acting member at the second temperature preventing movement of the engaging member by said first acting member when said first acting member starts said shape transformation.

2. An actuator according to claim 1, wherein said first acting member is constituted by a wire of shape memory alloy.

3. An actuator according to claim 1, wherein said second acting member is constituted by a wire of shape memory alloy.

4. An actuator according to claim 1, wherein said second acting member is constituted by a bimetal.

5. An actuator according to claim 1, further comprising a heating member for heating said first acting member.

6. An actuator according to claim 1 further comprising;

a frame and a pin fixed to said frame, wherein said engaging member is a lever, one end of said lever is engaged with said moving member, and the other end is fixed to said pin and rotatable around said pin.

7. An actuator according to claim 1, wherein said moving member is a flash unit of a camera.

8. An actuator comprising:

a first acting member starting a shape transformation upon reaching a first temperature;

a second acting member starting a shape transformation upon reaching a second temperature, lower than the first temperature, when heated by ambient temperature;

a connecting member connected to an engaging member via the first acting member, said connecting member being driven by said shape transformation of the second acting member to loosen a connection tension of said first acting member connecting said connecting member and said engaging member; and a moving member biased in a predetermined direction and engaged with said engaging member to stop movement of said moving member in the predetermined direction, starting of movement of the moving member in the predetermined direction being effected when the engagement of the engaging member with the moving member is released via said shape transformation of said first acting member.

9. An actuator comprising:

a heating member;

a first acting member starting a variation in shape when heated by said heating member to a first temperature;

an engaging member connected to said first acting member;

a moving member biased in a predetermined direction and engaged with said engaging member to stop movement of said moving member in the predetermined direction, starting movement of the moving member in the predetermined direction being effected when the engaged state of the engaging member with the moving member is released through the variation in shape of the first acting member when heated to the first temperature; and a second acting member starting a variation in shape when heated by ambient temperature to a second temperature, lower than the first temperature, and the variation in shape of the second acting member when heated to the second temperature preventing release of the engaged state of the engaging member even when the first acting member starts a variation in shape when heated to the first temperature.

10. An actuator comprising:

a first acting member having a first end and a second end, the first acting member beginning to shrink upon reaching a first temperature;

a connecting member connected to the first end of said first acting member and moved in a shrinking direction of the first acting member;

a second acting member beginning a shape transformation upon reaching a second temperature, lower than the first temperature, when heated by ambient temperature and causing said connecting member to be moved in the shrinking direction of said first acting member;

a heating member for heating said first acting member;

an engaging member connected to the second end of said first acting member; and a moving member biased in a predetermined direction, engaged with said engaging member to stop movement of said moving member in the predetermined direction, starting of movement of said moving member in the predetermined direction being effected when the engagement of said engaging member with the moving member is released via shrinkage of said first acting member when heated by said heating member to the first temperature.

11. An actuator comprising:

a first acting member having a first end and a second end, the first acting member beginning to shrink upon reaching a first temperature;

a connecting member connected to the first end of said first acting member and moved in a shrinking direction of the first acting member;

a resilient member;

an engaging member connected to the connecting member by said resilient member;

a second acting member beginning a shape transformation upon reaching a second temperature, lower than said first temperature, when heated by ambient temperature and causing said connecting member to be moved in the shrinking direction without moving said engaging member;

a heating member for heating said first acting member; and a moving member biased in a predetermined direction and engaged with said engaging member to stop movement of said moving member in the predetermined direction, starting of movement of said moving member in the predetermined direction being effected when the engagement of said engaging member with the moving member is released via shrinkage of said first acting member when heated by said heating member to the first temperature.

12. An actuator comprising:

a first acting member starting a shrinkage transformation upon reaching a first temperature;

a second acting member starting a shrinkage transformation upon reaching a second temperature, lower than the first temperature, when heated by ambient temperature;

a heating member to heat said first acting member;

an engaging member connected to said first acting member; and a moving member biased in a predetermined direction and engaged with said engaging member to stop movement of said moving member in the predetermined direction, starting of movement of said moving member in the predetermined direction being effected when the engagement of said engaging member with the moving member is released via starting said shrinkage transformation of said first acting member when heated by said heating member to the first temperature.

13. An actuator according to claim 12, wherein said first member is constituted by a wire of shape memory alloy.

14. An actuator according to claim 12, wherein said second member is constituted by a wire of shape memory alloy.

15. An actuator comprising:

a first acting member constituted by a shape memory alloy and starting to shrink in a shrinking direction upon reaching a first temperature;

an engaging member connected to said first acting member;

a heating member to heat said first acting member;

a moving member biased in a predetermined direction and engaged with said engaging member to stop movement of said moving member in the predetermined direction, starting of movement of said moving member in the predetermined direction being effected when the engagement of said engaging member with the moving member is released via shrinkage of said first acting member when heated by said heating member to the first temperature; and a second acting member starting a shape transformation upon reaching a second temperature, lower than said first temperature, when heated by ambient temperature, the shape transformation pulling the first acting member toward a direction opposite to the shrinkage direction of said first acting member and increasing a connection tension of the connection of said first acting member with the engaging member.

16. An actuator comprising:

a first acting member starting a shape transformation upon reaching a first temperature;

an engaging member connected to said first acting member and driven by said shape transformation of said first acting member;

a moving member engaged with said engaging member to stop movement of said moving member, the engagement of said engaging member with the moving member being released when said first acting member starts a shape transformation;

a second acting member starting a shape transformation upon reaching a second temperature, lower than said first temperature, when heated by ambient temperature; and an invalidating means responsive to said shape transformation of said second acting member for preventing movement of said moving member even when said engaging member is driven by said shape transformation of said first acting member.

17. An actuator comprising:

a first acting member starting a shrinkage transformation upon reaching a first temperature;

an engaging member connected to said first acting member;

a heating member to heat said first acting member;

a moving member biased in a predetermined direction and engaged with said engaging member to stop movement of said moving member, the engagement of the engaging member with the moving member being released through the shrinkage transformation of the first acting member heated to the first temperature by said heating member;

a second acting member starting a shape transformation upon reaching a second temperature, lower than said first temperature, when heated by ambient temperature; and a blocking member moved via said shape transformation of said second acting member to prevent movement of said moving member even when said first acting member starts said shrinkage transformation.

* * * * *